(12) United States Patent
Mead

(10) Patent No.: US 8,441,718 B2
(45) Date of Patent: May 14, 2013

(54) SPECTRALLY BEAM COMBINED LASER SYSTEM AND METHOD AT EYE-SAFER WAVELENGTHS

(75) Inventor: Roy D. Mead, Edmonds, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 589 days.

(21) Appl. No.: 12/624,327

(22) Filed: Nov. 23, 2009

(65) Prior Publication Data

US 2011/0122482 A1    May 26, 2011

(51) Int. Cl.
*G02F 1/35* (2006.01)
*H01S 3/00* (2006.01)

(52) U.S. Cl.
USPC ............ 359/326; 359/327; 359/334; 372/23; 372/97; 372/102; 385/37

(58) Field of Classification Search .................. 359/324, 359/327; 372/23, 97, 102; 385/37
See application file for complete search history.

(56) References Cited

U.S. PATENT DOCUMENTS

| | | | |
|---|---|---|---|
| 3,728,117 A | 4/1973 | Heidenhain et al. | |
| 4,278,902 A | 7/1981 | Loy et al. | |
| 4,313,648 A | 2/1982 | Yano et al. | |
| 4,367,040 A | 1/1983 | Goto | |
| 4,424,435 A | 1/1984 | Barnes, Jr. | |
| 4,523,315 A | 6/1985 | Stone | |
| 4,794,345 A | 12/1988 | Linford et al. | |
| 4,862,257 A | 8/1989 | Ulich | |
| 4,895,790 A | 1/1990 | Swanson et al. | |
| 5,052,780 A | 10/1991 | Klein | |
| 5,319,668 A | 6/1994 | Luecke | |
| 5,323,404 A | 6/1994 | Grubb | |
| 5,379,310 A | 1/1995 | Papen et al. | |
| 5,440,416 A | 8/1995 | Cohen et al. | |
| 5,526,155 A | 6/1996 | Knox et al. | |
| 5,608,826 A | 3/1997 | Boord et al. | |
| 5,642,447 A | 6/1997 | Pan et al. | |
| 5,661,835 A | 8/1997 | Kato et al. | |

(Continued)

FOREIGN PATENT DOCUMENTS

| | | |
|---|---|---|
| EP | 1 458 067 | 9/2004 |
| EP | 1 482 609 | 12/2004 |

(Continued)

OTHER PUBLICATIONS

Bochove, Eric J., "Theory of Spectral Beam Combining ", "IEEE Journal of Quantum Electronics", 2002, pp. 432-445, vol. 38, No. 5.

(Continued)

*Primary Examiner* — Hemang Sanghavi
(74) *Attorney, Agent, or Firm* — Charles A. Lemaire; Jonathan M. Rixen; Lemaire Patent Law Firm, P.L.L.C.

(57) ABSTRACT

Fiber-laser light is Raman shifted to eye-safer wavelengths prior to spectral beam combination, enabling a high-power, eye-safer wavelength directed-energy (DE) system. The output of Ytterbium fiber lasers is not used directly for spectral beam combining. Rather, the power from the Yb fiber lasers is Raman-shifted to longer wavelengths, and these wavelengths are then spectrally beam combined. Raman shifting is most readily accomplished with a "cascaded Raman converter," in which a series of nested fiber cavities is formed using fiber Bragg gratings.

22 Claims, 9 Drawing Sheets

U.S. PATENT DOCUMENTS

| | | | |
|---|---|---|---|
| 5,802,236 A | 9/1998 | DiGiovanni et al. | |
| 5,815,518 A | 9/1998 | Reed et al. | |
| 5,818,630 A | 10/1998 | Fermann et al. | |
| 5,838,700 A | 11/1998 | Dianov et al. | |
| 5,847,863 A | 12/1998 | Galvanauskas et al. | |
| 5,867,305 A | 2/1999 | Waarts et al. | |
| 5,907,436 A | 5/1999 | Perry et al. | |
| 5,930,030 A | 7/1999 | Scifres | |
| 5,974,060 A | 10/1999 | Byren et al. | |
| 6,014,249 A | 1/2000 | Fermann et al. | |
| 6,023,361 A | 2/2000 | Ford | |
| 6,028,879 A | 2/2000 | Ershov | |
| 6,031,952 A | 2/2000 | Lee | |
| 6,053,640 A | 4/2000 | Miyokawa et al. | |
| 6,061,170 A | 5/2000 | Rice et al. | |
| 6,072,931 A | 6/2000 | Yoon et al. | |
| 6,081,635 A | 6/2000 | Hehmann | |
| 6,097,863 A | 8/2000 | Chowdhury | |
| 6,163,552 A | 12/2000 | Engelberth et al. | |
| 6,163,554 A | 12/2000 | Chang et al. | |
| 6,181,465 B1 | 1/2001 | Grubb et al. | |
| 6,192,062 B1 | 2/2001 | Sanchez-Rubio et al. | |
| 6,208,679 B1 | 3/2001 | Sanchez-Rubio et al. | |
| 6,212,310 B1 | 4/2001 | Waarts et al. | |
| 6,226,077 B1 | 5/2001 | Dunne | |
| 6,275,623 B1 | 8/2001 | Brophy et al. | |
| 6,295,304 B1 | 9/2001 | Koch et al. | |
| 6,301,271 B1 | 10/2001 | Sanders et al. | |
| 6,310,899 B1 | 10/2001 | Jacobovitz-Veselka et al. | |
| 6,327,292 B1 | 12/2001 | Sanchez-Rubio et al. | |
| 6,330,523 B1 | 12/2001 | Kacyra et al. | |
| 6,339,662 B1 | 1/2002 | Koteles et al. | |
| 6,381,008 B1 | 4/2002 | Branagh et al. | |
| 6,381,388 B1 | 4/2002 | Epworth et al. | |
| 6,400,495 B1 | 6/2002 | Zayhowski | |
| 6,407,855 B1 * | 6/2002 | MacCormack et al. | 359/346 |
| 6,418,152 B1 | 7/2002 | Davis | |
| 6,426,965 B1 | 7/2002 | Chang et al. | |
| 6,434,172 B1 | 8/2002 | DiGiovanni et al. | |
| 6,445,844 B1 | 9/2002 | Neukermans et al. | |
| 6,456,756 B1 | 9/2002 | Mead et al. | |
| 6,496,301 B1 | 12/2002 | Koplow et al. | |
| 6,501,782 B1 | 12/2002 | Farmer | |
| 6,584,133 B1 | 6/2003 | Walker et al. | |
| 6,603,912 B2 | 8/2003 | Birks | |
| 6,625,180 B2 | 9/2003 | Bufetov et al. | |
| 6,625,364 B2 | 9/2003 | Johnson et al. | |
| 6,631,234 B1 | 10/2003 | Russell et al. | |
| 6,654,522 B2 | 11/2003 | Chandalia et al. | |
| 6,665,471 B1 | 12/2003 | Farmer et al. | |
| 6,696,142 B2 | 2/2004 | Baer et al. | |
| 6,697,192 B1 | 2/2004 | Fan et al. | |
| 6,717,655 B2 | 4/2004 | Cheng et al. | |
| 6,754,006 B2 | 6/2004 | Barton et al. | |
| 6,765,724 B1 | 7/2004 | Kramer | |
| 6,798,960 B2 | 9/2004 | Hamada | |
| 6,807,338 B2 | 10/2004 | Bouteiller et al. | |
| 6,819,871 B1 | 11/2004 | Baldwin et al. | |
| 6,822,796 B2 | 11/2004 | Takada et al. | |
| 6,829,421 B2 | 12/2004 | Forbes et al. | |
| 6,836,607 B2 | 12/2004 | Dejneka et al. | |
| 6,845,108 B1 | 1/2005 | Liu et al. | |
| 6,845,204 B1 | 1/2005 | Broeng et al. | |
| 6,865,344 B1 | 3/2005 | Johnson et al. | |
| 6,868,099 B1 | 3/2005 | Walker et al. | |
| 6,882,431 B2 | 4/2005 | Teich et al. | |
| 6,898,339 B2 | 5/2005 | Shah et al. | |
| 6,901,197 B2 | 5/2005 | Hasegawa et al. | |
| 6,914,916 B2 | 7/2005 | Pezeshki et al. | |
| 6,917,631 B2 | 7/2005 | Richardson et al. | |
| 6,937,795 B2 | 8/2005 | Squires et al. | |
| 6,950,692 B2 | 9/2005 | Gelikonov et al. | |
| 6,952,510 B1 | 10/2005 | Karlsen et al. | |
| 6,958,859 B2 | 10/2005 | Hoose et al. | |
| 6,959,021 B2 | 10/2005 | Po et al. | |
| 6,959,130 B2 | 10/2005 | Fauver et al. | |
| 6,960,027 B1 | 11/2005 | Krah et al. | |
| 6,961,356 B2 | 11/2005 | Brown | |
| 6,963,354 B1 | 11/2005 | Scheps | |
| 6,964,523 B2 | 11/2005 | Kohda et al. | |
| 6,965,469 B2 | 11/2005 | Avizonis et al. | |
| 6,996,343 B2 | 2/2006 | Neilson | |
| 7,043,127 B2 | 5/2006 | Hasegawa et al. | |
| 7,065,107 B2 | 6/2006 | Hamilton et al. | |
| 7,072,369 B2 | 7/2006 | Matsushita et al. | |
| 7,072,553 B2 | 7/2006 | Johnson et al. | |
| 7,106,932 B2 | 9/2006 | Birks et al. | |
| 7,113,327 B2 | 9/2006 | Gu et al. | |
| 7,113,524 B2 | 9/2006 | Bonaccini et al. | |
| 7,116,469 B2 | 10/2006 | Bragheri et al. | |
| 7,136,559 B2 | 11/2006 | Yusoff et al. | |
| 7,142,757 B1 | 11/2006 | Ward | |
| 7,167,300 B2 | 1/2007 | Fermann et al. | |
| 7,190,705 B2 | 3/2007 | Fermann et al. | |
| 7,199,919 B2 | 4/2007 | Emori et al. | |
| 7,199,924 B1 | 4/2007 | Brown et al. | |
| 7,206,123 B2 | 4/2007 | Emori et al. | |
| 7,221,822 B2 | 5/2007 | Grudinin et al. | |
| 7,227,814 B2 | 6/2007 | Frederick et al. | |
| 7,233,442 B1 * | 6/2007 | Brown et al. | 359/556 |
| 7,242,835 B2 | 7/2007 | Busse et al. | |
| 7,248,399 B2 | 7/2007 | Taniguchi et al. | |
| 7,259,906 B1 | 8/2007 | Islam | |
| 7,280,730 B2 | 10/2007 | Dong et al. | |
| 7,283,702 B2 | 10/2007 | Brosnan et al. | |
| 7,340,140 B1 | 3/2008 | Xu et al. | |
| 7,349,589 B2 | 3/2008 | Temelkuran et al. | |
| 7,349,611 B2 | 3/2008 | Broeng et al. | |
| 7,359,420 B2 | 4/2008 | Shchegrov et al. | |
| 7,362,497 B2 | 4/2008 | Hodder et al. | |
| 7,375,877 B1 | 5/2008 | Di Teodoro et al. | |
| 7,376,312 B2 | 5/2008 | Nawae et al. | |
| 7,376,315 B2 | 5/2008 | Kurosawa et al. | |
| 7,386,211 B1 | 6/2008 | Di Teodoro et al. | |
| 7,391,561 B2 | 6/2008 | Di Teodoro et al. | |
| 7,400,442 B2 | 7/2008 | Matsushita et al. | |
| 7,414,780 B2 | 8/2008 | Fermann et al. | |
| 7,424,193 B2 | 9/2008 | Galvanauskas | |
| 7,430,352 B2 | 9/2008 | Di Teodoro et al. | |
| 7,433,116 B1 | 10/2008 | Islam | |
| 7,436,588 B2 | 10/2008 | Rothenberg et al. | |
| 7,437,046 B2 | 10/2008 | DiGiovanni et al. | |
| 7,440,167 B2 | 10/2008 | Taniguchi et al. | |
| 7,447,444 B2 | 11/2008 | Igarashi et al. | |
| 7,471,705 B2 | 12/2008 | Gerstenberger et al. | |
| 7,477,666 B2 | 1/2009 | Liu | |
| 7,508,853 B2 | 3/2009 | Harter et al. | |
| 7,519,253 B2 | 4/2009 | Islam | |
| 7,532,656 B2 | 5/2009 | Yang et al. | |
| 7,535,631 B2 | 5/2009 | Brown et al. | |
| 7,576,909 B2 | 8/2009 | Harter et al. | |
| 7,590,323 B2 | 9/2009 | Broeng et al. | |
| 7,620,077 B2 | 11/2009 | Henderson | |
| 7,711,013 B2 | 5/2010 | Liu et al. | |
| 7,782,912 B2 | 8/2010 | Harter et al. | |
| 7,787,729 B2 | 8/2010 | Dong et al. | |
| 2002/0126956 A1 * | 9/2002 | Bouteiller et al. | 385/37 |
| 2002/0181856 A1 | 12/2002 | Sappey et al. | |
| 2003/0058524 A1 | 3/2003 | Akasaka et al. | |
| 2003/0068150 A1 | 4/2003 | Ariel et al. | |
| 2004/0032641 A1 | 2/2004 | Namiki et al. | |
| 2004/0033043 A1 | 2/2004 | Monro et al. | |
| 2004/0051937 A1 | 3/2004 | Emori et al. | |
| 2004/0076197 A1 | 4/2004 | Clarkson | |
| 2004/0190119 A1 | 9/2004 | Akasaka et al. | |
| 2004/0240038 A1 | 12/2004 | Kado et al. | |
| 2004/0240487 A1 * | 12/2004 | Borne et al. | 372/3 |
| 2005/0041702 A1 | 2/2005 | Fermann et al. | |
| 2005/0078352 A1 | 4/2005 | Emori et al. | |
| 2005/0157379 A1 | 7/2005 | Emori et al. | |
| 2005/0169590 A1 | 8/2005 | Alkeskjold | |
| 2006/0028374 A1 | 2/2006 | Fullerton | |
| 2006/0067632 A1 | 3/2006 | Broeng et al. | |
| 2006/0204190 A1 | 9/2006 | Ranka et al. | |
| 2006/0233554 A1 | 10/2006 | Ramachandran et al. | |
| 2007/0035810 A1 | 2/2007 | Henderson | |
| 2007/0041083 A1 | 2/2007 | Di Teodoro et al. | |

| 2007/0211773 | A1 | 9/2007 | Gerstenberger |
| 2007/0247701 | A1 | 10/2007 | Akasaka et al. |
| 2007/0247702 | A1 | 10/2007 | Taniguchi et al. |
| 2008/0179634 | A1 | 7/2008 | Takiguchi |
| 2009/0324170 | A1* | 12/2009 | Cheung et al. ............... 385/33 |
| 2010/0290106 | A1* | 11/2010 | DiGiovanni et al. ........ 359/334 |

FOREIGN PATENT DOCUMENTS

| WO | WO 0049436 | 8/2000 |
| WO | WO 0060388 | 10/2000 |
| WO | WO 0165647 A2 | 9/2001 |
| WO | PCTUS1057693 | 11/2011 |

OTHER PUBLICATIONS

Jackson, Stuart D., "Theoretical characterization of Raman oscillation with intracavity pumping of fiber lasers", "IEEE Journal of Quantum Electronics", 2001, pp. 625-634, vol. 37, No. 5.

Klingebiel et al, "Spectral beam combining of Yb-doped fiber lasers with high efficiency", "Journal of the Optical Society B", 2007, pp. 1716-1720, vol. 24, No. 8.

Krause, M., et al., "Cascaded silicon Raman lasers as mid-infrared sources", "Electronics Letters", 2006, pp. 21 vol. 42.

Emori et al., "High-power Cascaded Raman Fiber Laser with 41-W output power at 1480-nm band", "Optical Society of America", May 2007, pp. 1-2.

Miguelez et al., "Optical Segmentation Technology Alternative and Architectures", "Motorola", 2008, pp. 1-12.

Krause, J.T., et al., "ARC Fusion Splices With Near Pristine Strengths and Impoved Optical Loss", "22nd European Conference on Optical Communication", 1996, pp. 2.237-2.240.

Augst, S.J., et al., "Wavelength beam combining of ytterbium fiber lasers", "Opt. Lett.", 2003, pp. 331-333, vol. 28, No. 5.

Blazephotonics (Company), "Hollow Core Photonic Bandgap Fiber HC-580-01 Product Description", "http://www.crystal-fibre.com/datasheets/HC-580-01.pdf", Feb. 10, 2006.

Blazephotonics (Company), "High NA Multimode Fiber MM-37-01 Product Description", "http://www.crystal-fibre.com/datasheets/MM-37-01.pdf", 2005.

Brooks, Christopher D, et al., "1-mJ energy, 1-MW peak-power, 10-W averagepower, spectrally narrow, diffraction-limited pulses from a photonic-crystal f", "Optics Express", Oct. 31, 2005, pp. 8999-9002, vol. 13, No. 22.

Champert, P.A., et al., "3.5 W frequency-doubled fiber-based laser source at 772 nm", "Applied Physics Letters", Apr. 23, 2001, pp. 2420-2421, vol. 78, No. 17.

Chen et al., "Laser-to-Fiber Coupling Scheme by Utilizing a Lensed Fiber Integrated with a Long-Period Fiber Grating", "IEEE Photonics Technology Letters", May 2000, pp. 501-503, vol. 12, No. 5.

Cooper, L.J., et al., "High-power Yb-doped multicore ribbon fiber laser", Nov. 1, 2005, pp. 2906-2908, vol. 30, No. 21.

Crystal Fibre (Company), "High-Power Fiber Laser and Amplifier Subassembly Modules Product Description", "http://www.crystal-fibre.com/products/subassemblies.shtm", 2005 (copyright).

Crystal Fibre (Company), "Multimode Ultra High NA Photonic Crystal Fiber MM-HNA-110 Product Description", "http://www.crystal-fibre.com/datasheets/MM-HNA-110.pdf", Apr. 2005.

Crystal Fibre (Company), "Multimode Ultra High NA Photonic Crystal Fiber MM-HNA-200 Product Description", "http://www.crystal-fibre.com/datasheets/MM-HNA-200.pdf", Apr. 2005.

Crystal Fibre (Company), "Multimode Ultra High NA Photonic Crystal Fiber MM-HNA-35 Product Description", "http://www.crystal-fibre.com/datasheets/MM-HNA-35.pdf", Apr. 2005.

Crystal Fibre (Company), "Multimode Ultra High NA Photonic Crystal Fiber MM-HNA-5 Product Description", "http://www.crystal-fibre.com/datasheets/MM-HNA-5.pdf", Apr. 2005.

Crystal Fibre (Company), "Towards 100 kW fiber laser systems Scaling up power in fiber lasers for beam.combining", "http://www.crystal-fibre.com/support/White_Paper_-_Towards_100kW_fiber_laser_systems_-_Scaling_up_power_in_fiber_lasers_for_beam_combining.pdf", Feb. 28, 2006.

Davitt, Kristina, et al., "290 and 340 nm UV LED arrays for fluorescence detection from single airborne particles", "Optics Express", Nov. 14, 2005, pp. 9548-9555, vol. 13, No. 23.

Di Teodoro, Fabio, et al., "Harmonic generation of an Yb-doped photonic-crystal fiber amplifier to obtain 1ns pulses of 410, 160, and 190kW peak-pow", "Advanced Solid-State Photonics 29 Technical Digest, Paper ME3", 2006.

Di Teodoro, Fabio, et al., "Diffraction-limited, 300-kW peak-power pulses from a coiled multimode fiber amplifier", "Optics Letters", Apr. 1, 2002, pp. 518-520, vol. 27, No. 7.

Di Teodoro, Fabio, et al., "1.1 MW peak-power, 7 W average-power, high-spectral-brightness, diffraction-limited pulses from a photonic crystal fiber", "Optics Letters", Oct. 15, 2005, pp. 2694-2696, vol. 30, No. 20.

Dunne, Mike, "Laser-driven particle accelerators", "Science", Apr. 21, 2006, pp. 374-376, vol. 312.

Fan, T.Y., "Laser Beam Combining for High-Power, High Radiance Sources", "IEEE Journal of Selected Topics in Quantum Electronics", 2005, pp. 567-577, vol. 11.

Fan, T.Y., "Laser Beam Combining for High-Power, High-Radiance", "IEEE Journal of Selected Topics in Quantum Electronics", May 1, 2005, pp. 567-577, vol. 11, No. 3.

Furusawa, et al., "Cladding pumped Ytterbium-doped fiber laser with holey inner and outer cladding.", "Optics Express", Dec. 17, 2001, pp. 714-720, vol. 9, No. 13.

Galvanauskas, A., et al., "Fiber-laser-based femtosecond parametric generator in bulk periodically poled LiNbO3", "Optics Letters", Jan. 15, 1997, pp. 105-107, vol. 22, No. 2.

Galvanauskas, Almantas, "Mode-scalable fiber-based chirped pulse amplification systems", "IEEE Journal on Selected Topics in Quantum Electronics", Jul. 2001, pp. 504-517, vol. 7, No. 4.

Galvanauskas, A., et al., "Fiber-laser-based femtosecond parametric generator in bulk periodically poled LiNbO3", "Optics Letters", Jan. 15, 1997, pp. 105-107, vol. 22, No. 2.

Blaze Photonics (Crystal Fibre Company), "HC-580-01 'yellow' Hollow Core Photonic Bandgap Fiber", "http://www.crystal-fibre.com/datasheets/HC-580-01.pdf", Feb. 10, 2006.

Hehl, Karl, et al., "High-efficiency dielectric reflection gratings: design, fabrication, and analysis", "Appl. Opt.", 1999, pp. 6257-6271, vol. 38.

Henderson, Angus, et al., "Low threshold, singly-resonant CV OPO pumped by an all-fiber pump source", "Optics Express", Jan. 3, 2006, pp. 767-772, vol. 14, No. 2.

Krause, J.T., et al., "Arc Fusion Splices with Near Pristine Strengths and Improved Optical Loss", "22nd European Conference on Optical Communication—EEOC'96, Oslo, Norway", 1996, pp. 237-240, vol. 2.

Kristiansen, Rene E., et al., "Microstructured fibers and their applications", "Proceedings of the 4th Reunion Espanola of Optoelectronics (OPTOEL), CI-5", 2005, pp. 37-49.

Kristiansen, Rene E., et al., "Microstructured fibers and their applications", "Proceedings of the 4th Reunion Espanola of Optoelectronics (OPTOEL), CI-5", 2005, pp. 37-49.

Liem, A., et al., "100-W single-frequency master-oscillator fiber power amplifier", "Optics Letters", Sep. 1, 2003, pp. 1537-1539, vol. 28, No. 17.

Limpert, J., et al., "High power Q-switched Yb-doped photonic crystal fiber laser producing sub-10 ns pulses", "Appl. Phys. B 81", 2005, pp. 19-21.

Limpert, J., et al., "High-power rod-type photonic crystal fiber laser", "Optics Express", Feb. 21, 2005, pp. 1055-1058, vol. 13, No. 4.

Limpert, J., et al., "Low-nonlinearity single-transverse-mode ytterbium-doped photonic crystal fiber amplifier", "Optics Express", Apr. 5, 2004, pp. 1313-1319, vol. 12, No. 7.

Liu, F., et al., "Cost-effective wavelength selectable light source using DFB fibre laser array", "Electronics Letters", Mar. 30, 2000, pp. 620-621, vol. 36, No. 7.

Liu, A., et al., "Spectral beam combining of high power fiber lasers", "Proceedings of SPIE", Jun. 7, 2004, pp. 81-88, vol. 5335.

Loftus, T.H., et al., "Spectrally Beam-Combined Fiber Lasers for High-Average-Power Applications", "IEEE Journal of Selected Topics in Quantum Electronics", May 1, 2007, pp. 487-497, vol. 13, No. 3.

Madasamy, P., et al., "Dual-Grating Spectral Beam Combination", "IEEE Journal of Selected Topics in Quantum Electronics", Mar. 1, 2009, pp. 337-343, vol. 15, No. 2.

Moutzouris, Konstantinos, et al., "Highly efficient second, third and fourth harmonic generation from a two-branch femtosecond erbium fiber source", "Optics Express", Mar. 6, 2006, pp. 1905-1912, vol. 14, No. 5.

Perry, M.D., et al., "High-efficiency multilayer dielectric diffraction gratings", "Opt. Lett.", 1995, pp. 940-942, vol. 20.

Roser, F., et al., "131 W 220 fs fiber laser system", "Optics Letters", Oct. 15, 2005, pp. 2754-2756, vol. 30, No. 20.

Schreiber, T., et al., "Stress-induced single-polarization single-transverse mode photonic crystal fiber with low nonlinearity", "Optics Express", Sep. 19, 2005, pp. 7621-7630, vol. 13, No. 19.

"Sensor Systems for Biological Agent Attacks: Protecting Buildings and Military Bases", 2005, pp. 73, Publisher: Committee on Materials and Manufacturing Processes for Advanced Sensors, National Research Council.

Sorensen, T., et al., "Metal-assisted coupling to hollow-core photonic crystal fibres", "Electronics Letters", Jun. 9, 2005, vol. 41, No. 12.

Tunnermann, A., et al., "The renaissance and bright future of fibre lasers", "Journal of Physics B: Atomic, Molecular and Optical Physics", 2005, pp. S681-S693, vol. 38.

* cited by examiner

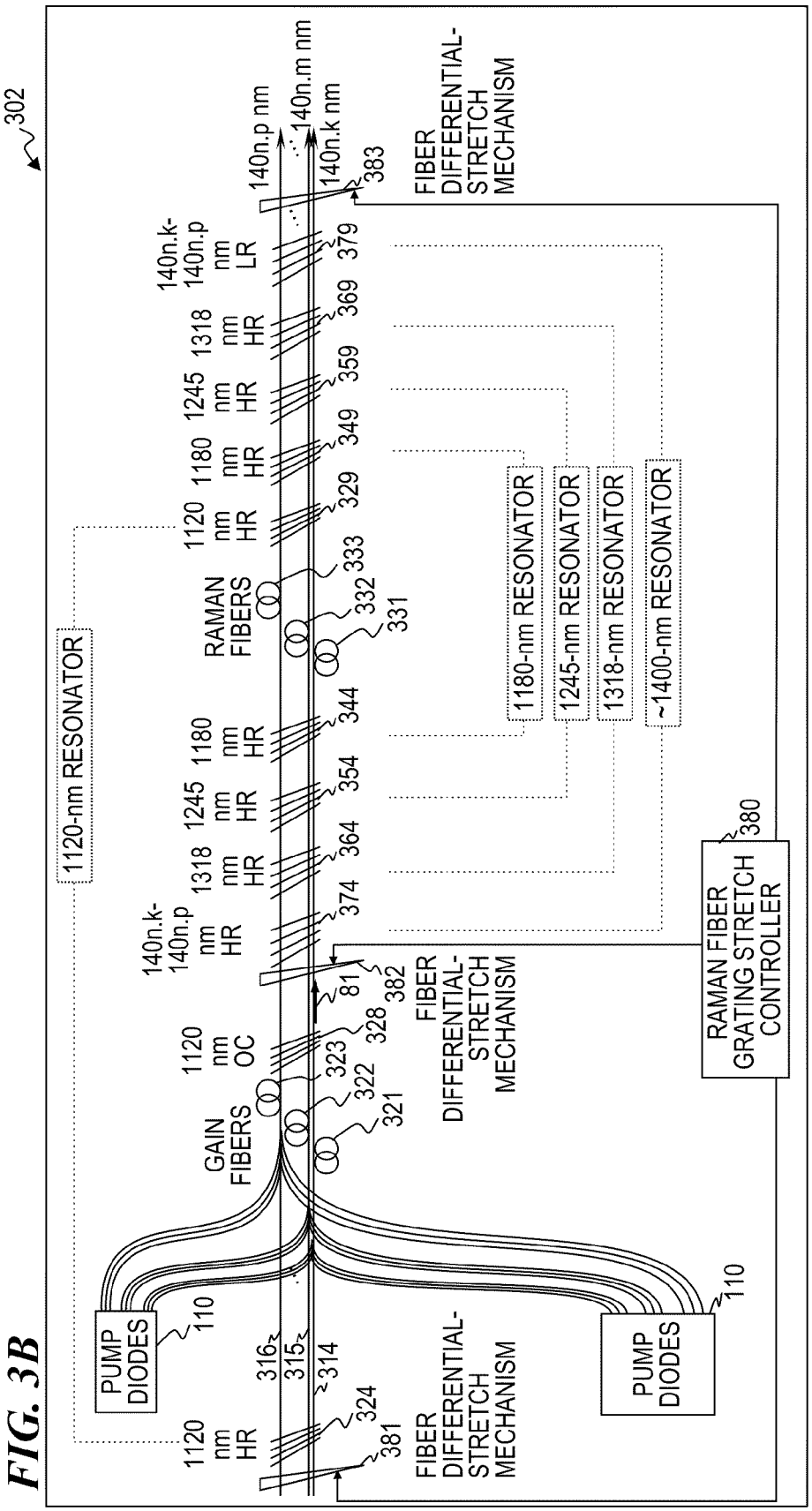

SPECTRALLY BEAM COMBINED LASER SYSTEM AND METHOD AT EYE-SAFER WAVELENGTHS

CROSS-REFERENCE TO RELATED APPLICATIONS

This invention is related to

U.S. Pat. No. 6,456,756 to Roy Mead, et al., issued Sep. 24, 2002, titled "Fiber Raman amplifier pumped by an incoherently beam combined diode laser";

U.S. Pat. No. 7,430,352 issued Sep. 30, 2008 to Fabio Di Teodoro et al., titled "Multi-segment photonic-crystal-rod waveguides for amplification of high-power pulsed optical radiation and associated method";

U.S. Pat. No. 7,386,211 issued Jun. 10, 2008 to Fabio Di Teodoro et al., titled "Method and apparatus for spectral-beam combining of megawatt-peak-power beams from photonic-crystal rods";

U.S. Pat. No. 7,199,924 issued Apr. 3, 2007 to Andrew J. W. Brown et al., titled "Apparatus and method for spectral-beam combining of high-power fiber lasers";

U.S. Pat. No. 7,535,631 issued May 19, 2009 to Andrew J. W. Brown et al., titled "Method and apparatus for spectral-beam combining of fiber-amplified laser beams using high-efficiency dielectric diffractive gratings";

U.S. Provisional Patent Application 61/263,736 filed Nov. 23, 2009 by Matthias P. Savage-Leuchs et al., titled "Q-switched oscillator seed-source for MOPA laser illuminator method and apparatus";

U.S. patent application Ser. No. 12/018,193 filed Jan. 22, 2008 by John D. Minelly et al., titled "High-energy eye-safe pulsed fiber amplifiers and sources operating in erbium's L-band"; (which issued as U.S. Pat. No. 7,872,794 on Jan. 18 2011);

U.S. Pat. No. 7,620,077 issued Nov. 17, 2009 to Angus J. Henderson, titled "Apparatus and method for pumping and operating optical parametric oscillators using DFB fiber lasers";

U.S. Pat. No. 7,471,705 issued Dec. 30, 2008 to David C. Gerstenberger et al., titled "Ultraviolet laser system and method having wavelength in the 200-nm range"; and U.S. Pat. No. 7,391,561 issued Jun. 24, 2008 to Fabio Di Teodoro et al., titled "Fiber- or rod-based optical source featuring a large-core, rare-earth-doped photonic-crystal device for generation of high-power pulsed radiation and method", which are all incorporated herein in their entirety by reference.

FIELD OF THE INVENTION

The invention relates generally to optical waveguides and more particularly to spectral-beam combining of Raman-shifted laser beams having a plurality of different eye-safer wavelengths generated by fiber Raman lasers and/or fiber Raman amplifiers in a master-oscillator power-amplifier configuration that output, for example, a plurality of wavelengths each longer than about 1400 nm.

BACKGROUND OF THE INVENTION

The current state-of-the-art fiber lasers and fiber amplifiers using Raman wavelength shifting can produce wavelengths of greater than 1400 nm.

Spectral beam combining of beams from fiber lasers is a promising technology enabling a very-high-power laser with excellent beam quality. The most efficient fiber laser type for such systems is the ytterbium-doped (Yb) fiber laser, which lases around 1,060 nm. Such wavelengths are not "eye-safe," so the invention provides a means for using efficient Yb fiber lasers, but with output at eye-safe wavelengths greater than 1,400 nm.

Even for military systems, it is often desired that lasers operate at so-called "eye-safer" wavelengths. At such wavelengths, much of the light is absorbed in the cornea of the eye instead of being focused onto the retina; consequently, the eye can withstand about three orders of magnitude more light at "eye-safer" wavelengths without suffering damage than it can at other wavelengths (such as 1064 nm) that reach the retina. Use of lasers at eye-safer wavelengths leads to fewer blinding and other accidents in training or routine testing and operation of military systems and others.

U.S. Pat. No. 4,523,315 titled "Raman gain medium" issued to Stone on Jun. 11, 1985, and is incorporated herein by reference. Stone described a new Raman gain medium, having an optical fiber into which molecular gas has been diffused. This Raman fiber combines the advantages of a fiber, i.e., long interaction path, low loss, controllable dispersion, and convenience in handling, with the large Raman wave-number shift of the gas, i.e., 4136 cm.$^{-1}$ for $H_2$ in silica. A laser made with such a medium can provide a relatively high power, tunable, coherent signal source in the near and far infrared regions.

Even when a fiber amplifier or fiber laser is designed to compensate for the above effects, there will be a limit on the maximum power that can be obtained from a single fiber when scaling to larger fiber sizes and/or lengths, pump powers, and the like.

U.S. Pat. No. 6,192,062 to Sanchez-Rubio et al. entitled "Beam combining of diode laser array elements for high brightness and power" and U.S. Pat. No. 6,208,679 to Sanchez-Rubio et al. entitled "High-power multi-wavelength external cavity laser" describe the fundamental techniques of spectral beam combining, and both are incorporated herein by reference.

In some embodiments, the gratings used for spectral-beam combining are "blazed," i.e., formed with V-grooves having sidewall angles that are asymmetrical with respect to a vector normal to the overall surface of the grating. U.S. Pat. No. 3,728,117 to Heidenhain et al. entitled "Optical Diffraction Grid" (incorporated herein by reference) describes a method for making blazed gratings having asymmetric grooves. U.S. Pat. No. 4,895,790 to Swanson et al. entitled "High-efficiency, multilevel, diffractive optical elements" (incorporated herein by reference) describes a method for making blazed gratings having asymmetric grooves using binary photolithography to create stepped profiles. U.S. Pat. No. 6,097,863, titled "Diffraction Grating with Reduced Polarization Sensitivity" issued Aug. 1, 2000 to Chowdhury (incorporated herein by reference) describes a reflective diffraction grating with reduced polarization sensitivity for dispersing the signals. The Chowdhury grating includes facets that are oriented for reducing efficiency variations within a transmission bandwidth and that are shaped for reducing differences between the diffraction efficiencies in two orthogonal directions of differentiation. U.S. Pat. No. 4,313,648 entitled "Patterned Multi-Layer Structure and Manufacturing Method" issued Feb. 2, 1982 to Yano et al. (incorporated herein by reference) describes a manufacturing method for a patterned (striped) multi-layer article.

U.S. Pat. No. 6,822,796 to Takada et al. entitled "Diffractive optical element" (incorporated herein by reference) describes a method for making blazed gratings having asymmetric grooves with dielectric coatings. U.S. Pat. No. 6,958, 859 to Hoose et al. entitled "Grating device with high diffraction efficiency" (incorporated herein by reference) describes a method for making blazed gratings having dielectric coatings.

U.S. Pat. No. 5,907,436 entitled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 6,212,310 entitled "High power fiber gain media system achieved through power scaling via multiplexing" issued 3 Apr. 2001 to Waarts et al., and is incorporated herein by reference. This patent describes certain methods of power scaling by multiplexing multiple fiber gain sources with different wavelengths; pulsing or polarization modes of operation is achieved through multiplex combining of the multiple fiber gain sources to provide high power outputs, such as ranging from tens of watts to hundreds of watts, provided on a single mode or multimode fiber. One method described by Waarts et al. is similar to that shown in the present invention shown in FIG. 2A, described below, where a plurality of input laser beams of differing wavelengths are directed at different angles to a diffraction grating, which diffracts the beams into a single output beam; however, Waarts et al.'s output beam necessarily has a wavelength linewidth-dependent chromatic divergence introduced by the grating. The present invention includes many distinguishing features not in Waarts et al.

Generation of eye-safer wavelengths for spectral beam combining has been suggested using either erbium-doped fiber lasers (lasing around 1,540 nm) or thulium-doped fiber lasers (lasing around 1,900 nm). However, fiber lasers using these dopants are not as efficient as ytterbium-doped lasers in converting electricity and pump light into laser output power.

There is a need for improved laser systems, particularly fiber lasers and/or fiber optical amplifiers operating at eye-safer wavelengths, wherein the optical outputs from a plurality of fibers and/or other lasers are combined into a single beam.

SUMMARY OF THE INVENTION

In some embodiments, the present invention provides an apparatus and method for generating a plurality of very high-power laser beams using Raman fiber lasers (operating in a power-oscillator mode) and/or master-oscillator power-amplifier lasers that use Raman fiber amplifiers, wherein each of a plurality of the laser beams has a slightly different wavelength than a plurality of the other laser beams. The present invention spectral-beam combines these laser beams from fiber lasers for directed-energy (DE) weapons; for example, as being proposed for the U.S. robust electric-powered laser initiative (RELI). The present invention produces a high-power laser for DE at eye-safer wavelengths.

Yoshihiro Emori et al. have reported a 41-watt output from a Raman fiber laser. See Emori et al. "High-power Cascaded Raman Fiber Laser with 41-W output power at 1480-nm band", Conference on Lasers and Electro-Optics/Quantum Electronics and Laser Science Conference and Photonic Applications Systems Technologies, OSA Technical Digest Series (CD) (Optical Society of America, 2007), paper CFI2. Publication Date: 6-11 May 2007 pages: 1-2, which is incorporated herein by reference.

Prior art and conventional systems use Er-doped or Tm-doped fiber lasers operating directly at longer wavelengths (approximately 1.55 microns or approximately 1.95 microns, respectively). (The broad peak gain bandwidth of Tm fiber is about 1.9-2.0 microns, although it can be operated less efficiently and with lower gain at less than 1.9 microns, e.g., at 1.85 microns.) In contrast, the present invention allows use of efficient Yb-doped fiber lasers (which are more efficient in generating laser energy than are Er-doped or Tm-doped fiber lasers) to produce laser energy that is then Raman shifted to eye-safer wavelengths. The present invention provides significant overall enhancement to product performance of Yb-doped fiber laser output, by converting the output to eye-safer wavelengths (in some embodiments, to wavelengths greater than about 1400 nm).

While other fiber-laser alternatives are available, the present invention provides improved performance (higher output power) and/or lower cost at eye-safer wavelengths. This has particular use in the DE area.

Various factors limit the amount of power that can be handled in a fiber amplifier, such as breakdown of the core material by the high electric field of the laser pulse and damage to the exit facets of the fibers. In some embodiments, the output of Ytterbium-doped fiber lasers is not used directly for spectral-beam combining, since combining the high-power beams (e.g., before the beams enter the Raman-shifting fiber, and wherein the beams can include pulsed or continuous-wave (CW) optical power) would lead to power levels above what the Raman fiber could handle. Rather, the power from the Yb fiber pump lasers is first Raman-shifted to a plurality of closely spaced narrow-band longer wavelengths using a plurality of grating-tuned optical gain fibers which are then used as fiber Raman lasers (i.e., in a power-oscillator (PO) configuration) and/or fiber Raman amplifiers that amplify a high-quality, narrow-band seed laser signal in a master-oscillator power-amplifier (MOPA) configuration. The plurality of Raman fibers output a plurality of laser beams each having a different wavelength that is longer than the wavelength(s) of the Yb-doped pump lasers, and these narrow-band, longer-wavelength beams are then spectrally beam combined (SBCed) to form a single high-quality very high-power output beam. In some embodiments, Raman shifting is readily accomplished with a "cascaded Raman converter," in which a series of nested fiber cavities is formed using fiber-Bragg gratings (FBGs). While generic cascaded Raman-converter (CRC) fiber lasers (also called cascaded Raman resonators (CRRs)) are a well-known technology, what is new in the present invention is carefully controlling a plurality of such CRC fiber lasers to each produce one of a plurality of narrow-band (narrow linewidth) closely spaced different-wavelength high-power outputs, and using these CRC laser outputs in a spectral-beam-combined laser system. Resonant cavities are formed with central wavelengths corresponding to successive Raman shifts in the optical fiber forming the Raman-shift cavity. In some embodiments, a number (e.g., 2, 3, 4, 5 or 6 or more) of overlapped cavities are formed within the same piece of Raman-shifting fiber, so several Raman shifts (successive shifts each to a longer wavelength) are accomplished in a single fiber.

In some embodiments, ytterbium-doped fiber lasers with Raman shifting are more efficient than erbium-doped fiber lasers. Thulium-doped fiber lasers can be reasonably efficient, but may be less attractive, in some embodiments, because their wavelength is much longer than necessary for eye safety, leading to greater diffraction. An additional advantage of the Raman-shifting approach is that the gain bandwidth of the Raman-shifted lasers can be much more than that of the original fiber lasers. Consequently, a wider spectrum of differing wavelengths can be generated for combination, enabling more system-design flexibility in channel spacing, and facilitating use of more channels for higher-power systems.

BRIEF DESCRIPTION OF THE DRAWINGS

FIG. 3B is a block diagram of a subsystem 302 that includes a set of cascaded Raman-converter fiber lasers 314, 315 . . . 316 whose outputs are later spectral-beam combined into a single beam using a spectral-beam combiner (SBC) such as shown in FIG. 2A or FIG. 2B, according to some embodiments of the present invention.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

In some embodiments, the present invention provides an apparatus and process wherein high-power laser signals (such as from Yb-doped fiber lasers that are pumped using semiconductor pump lasers) are converted to a plurality of different longer wavelengths using cascaded Raman-converter (CRC) fibers having fiber-Bragg gratings (FBGs) that form overlapping resonator cavities at each of a plurality of successively longer wavelengths. In some embodiments, the output laser beams are at a plurality of different closely-spaced narrow-band wavelengths in the general range of about 1400 nanometers (nm) to about 1500 nm. Since the front parts (e.g., cornea) of the human eye are relatively opaque to such wavelengths, the output of such wavelengths is relatively safer for human eyes (thus, these are called eye-safer wavelengths) than are wavelengths in the visible spectrum (about 400 nm to about 700 nm) or the near-infrared (NIR) wavelengths of 700 nm to 1350 nm, where the cornea is relatively transparent and permanent damage to the retina of the eye can readily happen.

Figure 1:
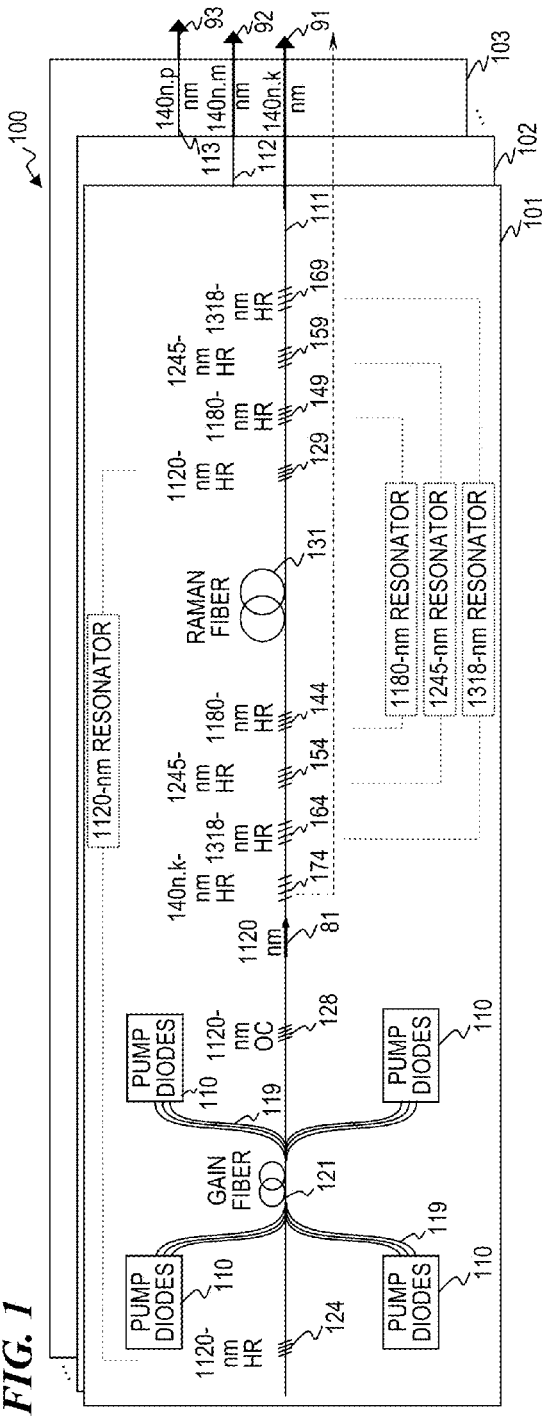
FIG. 1 is a block diagram of a subsystem 100 that includes a set of cascaded Raman-converter (CRC) fiber-laser modules 101, 102 . . . 103, each tuned to a different wavelength, according to some embodiments of the present invention.

FIG. 1 is a block diagram of a subsystem 100 that includes a set of cascaded Raman-converter (CRC) fiber-laser modules 101, 102 . . . 103, each tuned to a different wavelength, according to some embodiments of the present invention. In some embodiments, each of the (CRC) fiber laser modules 101, 102 . . . 103 contains substantially similar components, differing only in one or more of the wavelengths used (wherein the wavelengths are determined by the grating spacings of the fiber-Bragg gratings on the fibers). In some embodiments, module 101 outputs a wavelength denoted as 140 n.k nanometers (e.g., in some embodiments, 1400.0 nm), while module 102 outputs a wavelength denoted as 140 n.m nanometers (e.g., in some embodiments, 1400.1 nm), and module 103 outputs a wavelength denoted as 140 n.p nanometers (e.g., in some embodiments, 1400.3 nm). In some embodiments, additional modules are used, each outputting an additional different eye-safer wavelength. In some embodiments, module 101 includes a signal fiber 111 that includes a laser gain fiber 120 (e.g., a fiber having one or more central cores surrounded by an inner cladding that carries pump light from one or both ends and exposes the core to pump light (i.e., pump light propagating in the undoped inner cladding will enter the core from the inner cladding) along a distance of the fiber, with an outer cladding surrounding the inner cladding and acting to contain the pump light and prevent the pump light from leaking out of the fiber). In some embodiments, a plurality of pump diodes (e.g., semiconductor laser bars each having combiner optics that couple the pump laser light into coupling fibers that are connected to the inner cladding of the gain fiber 120 at the left-hand end (as shown here and in FIG. 3A, FIG. 3B, FIG. 3C, FIG. 3D and FIG. 3E) and/or the right-hand end (as shown here)) provide the optical-pump energy for the Yb-doped gain fiber 121 to lase. In some embodiments, gain fiber 121 is within a laser cavity formed by grating 124 on the left-hand end (in some embodiments, a fiber-Bragg grating (FBG) that is highly reflective (HR) of light having a wavelength at 1120 nm) and output-coupling (OC) grating 128 (in some embodiments, an FBG that is partially reflective of light having a wavelength at 1120 nm) on the right-hand end, wherein the pump light from pump laser diodes 110 provide the pump energy for lasing. Yb provides the active dopant, and the gratings 124 and 128 provide the feedback for lasing at the signal wavelength (e.g., 1120 nm). In some embodiments, this configuration provides two cavities that are coupled to one another through OC grating 128, wherein the first cavity between HR grating 124 and OC grating 128 includes gain fiber 121, and the second cavity between OC grating 128 and HR grating 129 contains the 1120-nm light that is available for the first Raman conversion (Stokes scattering to a longer wavelength) to 1180-nm-wavelength light. In some embodiments, the OC grating 128 is substantially transparent at 1120 nm (allowing substantially all of the signal light 81 at 1120 nm to pass through. In other embodiments, OC grating 128 is omitted, and the lasing cavity is between grating 124 on the left-hand end and grating 129 on the right-hand end). In some embodiments, grating 124 includes a portion that is highly reflective at 1120 nm (the signal wavelength) to form the left-hand end of the signal resonator.

As used herein, Raman conversion (equivalently spoken of as Raman scattering, stimulated Raman scattering, or SRS) refers to processes in which an input photon is converted to an output photon of a different wavelength, at the same time consuming or generating a phonon in the solid-state material. If a phonon is generated and so the output photon is at a lower energy (longer wavelength), the process is also referred to as Stokes conversion or Stokes scattering. In cases where a phonon is consumed and the output photon is at a higher energy (shorter wavelength) the process is also referred to anti-Stokes conversion or anti-Stokes scattering.

In some embodiments, each Raman laser is highly efficient at converting laser power at very high power levels (e.g., in some embodiments, hundreds of watts (e.g., in the range of 100-200 watts, 200-400 watts, or 400-999 watts), thousands of watts (e.g., in the range of 1000-2000 watts, 2000-4000 watts, or 4000-9999 watts) or even tens of thousands of watts (e.g., in the range of 10000-20000 watts, 20000-40000 watts, or even 40000 or more watts) continuous wave (CW; i.e., a laser beam that is continuous and substantially constant in amplitude when the laser is on, and not pulsed or amplitude modulated)). The embodiment shown in FIG. 1 is called a master-oscillator configuration, wherein the main fiber laser that includes the gain fiber 120 and the main feedback gratings 121 and 129 is providing both the frequency control and the power amplification. In other embodiments (not shown), a master-oscillator power amplifier configuration is used to generate the 1120-nm laser light and the Raman fiber is made sufficiently long so as to convert a majority of the 1120-nm light to longer wavelengths by Raman shifting in a single pass of the 1120-nm light.

In other embodiments, other initial laser wavelengths are used, such as 1060 nm or other wavelengths. In some embodiments, semiconductor-diode-laser light is used as the initial laser light (see, for example, the configuration shown in FIG. 3E described below) that is successively Raman shifted to longer and longer intermediate Raman-resonator wavelengths until finally output at one of the plurality of eye-safer wavelengths that are then spectral-beam combined (SBCed) into a single output beam of very high power and multiple wavelengths.

In the embodiment shown, signal fiber 111 also includes a Raman-shifting fiber 130. Since the cavity for the 1120-nm resonator includes the Raman fiber 131, the 1120-nm light is Raman shifted to one or more wavelengths around 1180 nm, wherein the 1180-nm light is reflected back and forth between gratings 144 and 149, each of which is highly reflective at 1180 nm and substantially transparent at other wavelengths (i.e., in some embodiments, at least substantially transparent at about 1120 nm, about 1245 nm, about 1318 nm, and about 1400 nm, which are the other signal wavelengths within the overlapped cascaded resonators here). Raman shifting of laser wavelengths in optical fibers is well understood by those of skill in the art, and is described in the various other patents on Raman-fiber lasers that are incorporated herein by reference. Similarly, the 1180-nm light is Raman shifted to one or more wavelengths around 1245 nm, wherein the 1245-nm light is reflected back and forth between gratings 154 and 159, each of which is highly reflective at 1245 nm and substantially transparent at other wavelengths (i.e., in some embodiments, at least substantially transparent at about 1120 nm, about 1318 nm, and about 1400 nm, which are the other signal wavelengths within the overlapped cascaded resonators here (in the embodiment shown, the 1180-nm light is reflected by gratings 144 and 149 and thus that light does not reach gratings 154 and 159)). In like manner, the 1245-nm light is Raman shifted to one or more wavelengths around 1318 nm, wherein the 1318-nm light is reflected back and forth between gratings 164 and 169, each of which is highly reflective at 1318 nm and substantially transparent at other wavelengths (i.e., in some embodiments, at least substantially transparent at about 1120 nm and about 1400 nm, which are the other signal wavelengths within the overlapped cascaded resonators here (in the embodiment shown, the 1180-nm light is reflected by gratings 144 and 149 and thus that light does not reach gratings 164 and 169, and the 1245-nm light is reflected by gratings 154 and 159 and thus that light also does not reach gratings 161 and 169)).

In some embodiments, grating 174 is a very narrow-band high-reflectivity wavelength filter that is used to precisely set the output wavelength of output signal 91 to a wavelength designated as 140 n.k nm (e.g., in some embodiments, 1400.0 nm). In some embodiments, the corresponding gratings for modules 102 and 103 are set to be very narrow-band high-reflectivity wavelength filters that are used to precisely set the output wavelengths of their respective output signals 92 and 93 wavelengths designated as 140 n.m nm (e.g., in some embodiments, 1400.1 nm) and 140 n.p nm (e.g., in some embodiments, 1400.2 nm). In some embodiments, a partially reflective, partially transmissive grating filter is also included toward the right-hand end of fiber 111, in order to provide a multiple-pass resonator cavity with grating 174 (such as gratings 379 shown in FIG. 3B, FIG. 3C and FIG. 3D).

In some embodiments, module 102 includes a signal fiber 112, and module 103 includes a signal fiber 113 that are each substantially similar to signal fiber 111 of module 101, except that signal fiber 112 is tuned (e.g., by stretching the fiber (e.g., by heating or by attaching to a piezo-electro-mechanical element or other suitable method)) such that its grating spacings are proportionally different than the grating spacings of signal fiber 111, and signal fiber 113 is tuned such that its grating spacings are proportionally also different than the grating spacings of signal fiber 111 and signal fiber 112, in order that each of the output wavelengths is centered on its respective different desired frequency and wavelength (e.g., at 1400 nm, 1401 nm and 1402 nm, respectively; or at 1400.0, 1400.1 and 1400.2 respectively).

Of course, other embodiments include a great number of other CRC fiber-laser modules, each set to a different wavelength in the range of, e.g., about 1400 nm to about 1500 nm. For example, if the wavelength spacing is 0.1 nm between adjacent-signal wavelengths, this range of 1400 nm to 1500 nm, inclusive, could support up to 1001 different wavelengths, each implemented on a substantially similar CRC fiber-laser unit such as unit 101. In other embodiments, Raman lasing wavelengths inside and/or outside of the range of 1400 nm to 1500 nm, inclusive, are used. For example, in some embodiments, Raman lasing wavelengths in the range of about 1400 nm to about 1410 nm, inclusive, are used; in some embodiments, Raman lasing wavelengths in the range of about 1411 nm to about 1420 nm, inclusive, are used; in some embodiments, Raman lasing wavelengths in the range of about 1421 nm to about 1430 nm, inclusive, are used; in some embodiments, Raman lasing wavelengths in the range of about 1431 nm to about 1440 nm, inclusive, are used; in some embodiments, Raman lasing wavelengths in the range of about 1441 nm to about 1450 nm, inclusive, are used; in some embodiments, Raman lasing wavelengths in the range of about 1451 nm to about 1460 nm, inclusive, are used; in some embodiments, Raman lasing wavelengths in the range of about 1461 nm to about 1470 nm, inclusive, are used; in some embodiments, Raman lasing wavelengths in the range of about 1471 nm to about 1480 nm, inclusive, are used; in some embodiments, Raman lasing wavelengths in the range of about 1481 nm to about 1490 nm, inclusive, are used; in some embodiments, Raman lasing wavelengths in the range of about 1491 nm to about 1500 nm, inclusive, are used. In still other embodiments, Raman lasing wavelengths in the range of about 1310 nm to about 1399 nm, inclusive, are used, while in other embodiments, Raman lasing wavelengths in the range of about 1501 nm to about 1600 nm, inclusive, are used. In some embodiments, Raman lasing wavelengths in the range that includes two or more of the above-listed ranges are used within a single SBC unit to provide a single output beam that combines the wavelengths of all of the input CRC fiber-laser-beam outputs (e.g., the plurality of beams 91, 92 . . . 93).

Figure 2A:
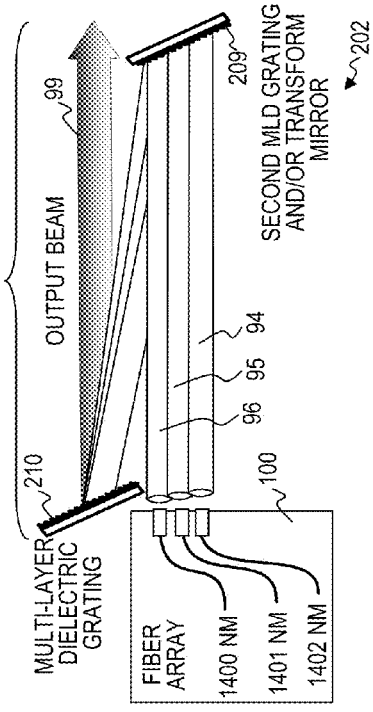
FIG. 2A is a block diagram of a spectral-beam-combining system 201 that uses a set 100 of cascaded Raman-converter fiber-laser modules whose outputs are combined into a single beam using a spectral-beam combiner 211, according to some embodiments of the present invention.

FIG. 2A is a block diagram of a spectral-beam-combined system 201 that uses a subsystem 100 that includes a set of cascaded Raman-converter fiber-laser modules whose outputs are combined into a single beam using a spectral-beam combiner 211, according to some embodiments of the present invention. In some embodiments, the set of CRC fiber-laser modules 100 is as described in FIG. 1, while in other embodiments, a set of modules such as are described in FIG. 3A, FIG. 3B, FIG. 3C, FIG. 3D or FIG. 3E are substituted instead. In some embodiments, the plurality of beams 91, 92 . . . 93 (each having a different wavelength) are emitted from the fiber ends and propagate toward the right, where they are reflected and transformed by highly reflective transform mirror 208 (in some embodiments, a mirror that has a multi-layer dielectric coating that is configured to reflect light of the signal wavelengths (e.g., around 1400 nm) with high efficiency) into converging collimated beams directed toward output grating 210. These collimated beams impinge on output grating 210 at a plurality of different angles each designed such that the diffracted light that is output in beam 99 is the collimated combination of the plurality of input beams. The output beam is thus the collimated combination of the input wavelengths and the input powers. In some embodiments, output grating 210 includes a blazed dielectric-coated grating such as described in U.S. Pat. No. 6,958,859 to Hoose et al. entitled "Grating device with high diffraction efficiency" (incorporated herein by reference), which describes a method for making blazed gratings having dielectric coatings. In some embodiments, output grating 210 includes a multi-layer dielectric-coated grating such as described U.S. Pat. No. 5,907,436 titled "Multilayer dielectric diffraction gratings" issued May 25, 1999 to Perry et al., which is incorporated herein by reference.

Figure 2B:
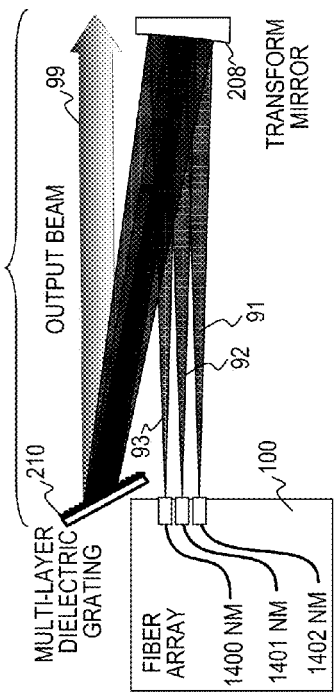
FIG. 2B is a block diagram of a spectral-beam-combining (SBC) system 202 that uses a set 100 of cascaded Raman-converter fiber-laser modules whose outputs are combined into a single beam using a two-grating spectral-beam combiner 212, according to some embodiments of the present invention.

FIG. 2B is a block diagram of a spectral-beam-combined (SBC) system 202 that uses a subsystem 100 that includes a set of cascaded Raman-converter fiber-laser modules whose outputs are combined into a single beam using a two-grating spectral-beam combiner 212, according to some embodiments of the present invention.

In some embodiments, the SBC combiners (such as SBC combiner 211 of FIG. 2A or SBC combiner 212 of FIG. 2B) used in the present invention are the same or similar to those that are described in U.S. Pat. No. 7,199,924 titled "Apparatus and method for spectral-beam combining of high-power fiber lasers," which issued on Apr. 3, 2007 to Andrew J. W. Brown et al., and U.S. Pat. 7,430,352 titled "Multi-segment photonic-crystal-rod waveguides for amplification of high-power pulsed optical radiation and associated method," which issued on Sept. 30, 2008 to Fabio Di Teodoro et al., which are both incorporated herein by reference. The grating 209 imposes a spectral spreading of each input beam (even though each input beam is a narrow-linewidth beam centered at its own wavelength, each beam is diffracted at a different main angle but also starts to spread as its component wavelengths are diffracted at slightly different angles. The second grating imposes the opposite spreading of each beam, thus preventing further chromatic dispersion. With gratings designed to provide accurate compensation (such as having gratings with the same grating spacing and positioned parallel to one another and facing the beams at substantially a Littrow angle for the center beam), the output beam will have little or no further chromatic dispersion, and the plurality of input beams 94, 95 ... 96 will be superimposed on top of one another and collimated.

Figure 3A:
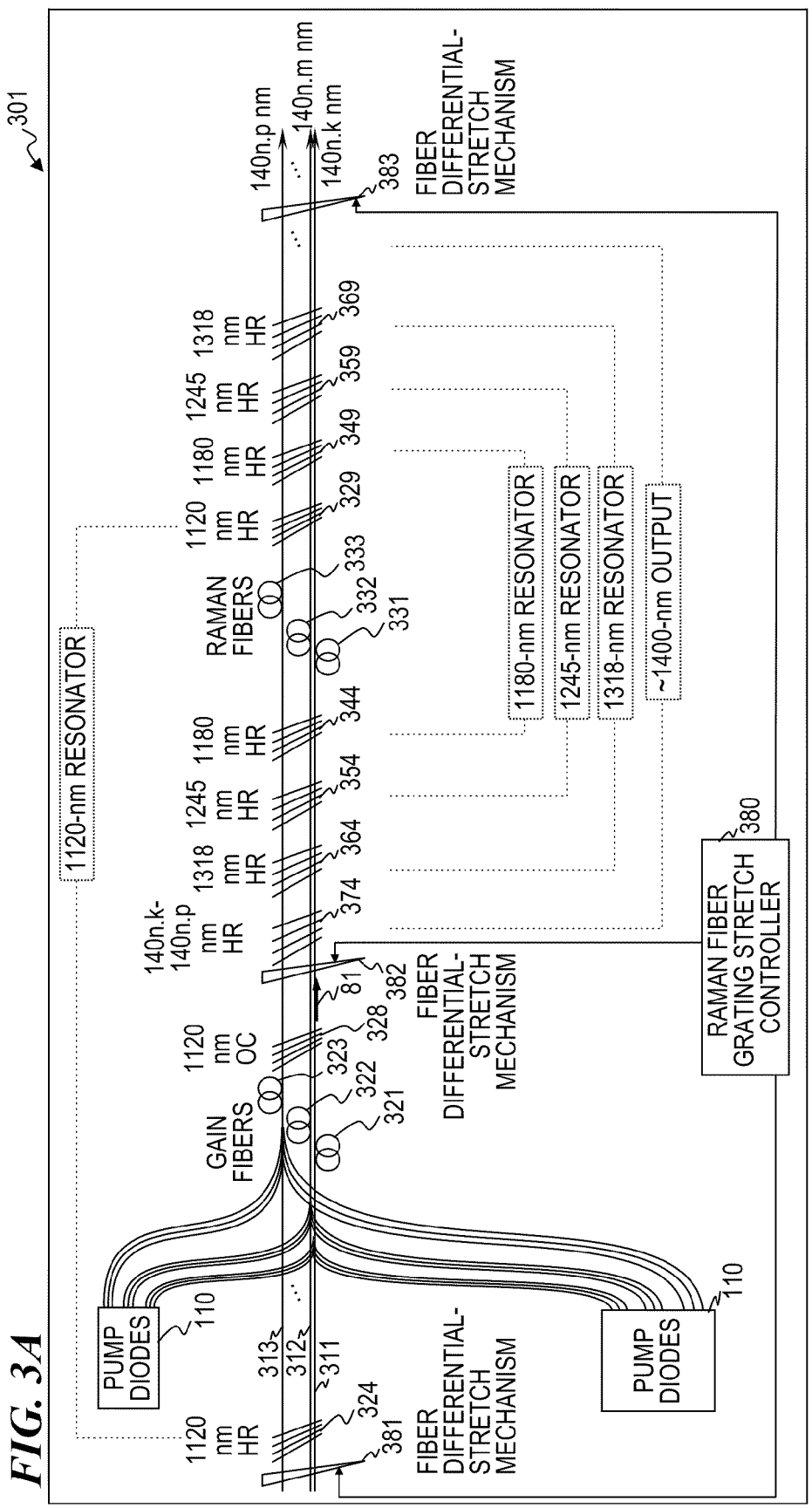
FIG. 3A is a block diagram of a subsystem 301 that includes a set of cascaded Raman-converter fiber lasers 311, 312 . . . 313 whose outputs are later spectral-beam combined into a single beam using a spectral-beam combiner such as shown in FIG. 2A or FIG. 2B, according to some embodiments of the present invention.
Figure 3C:
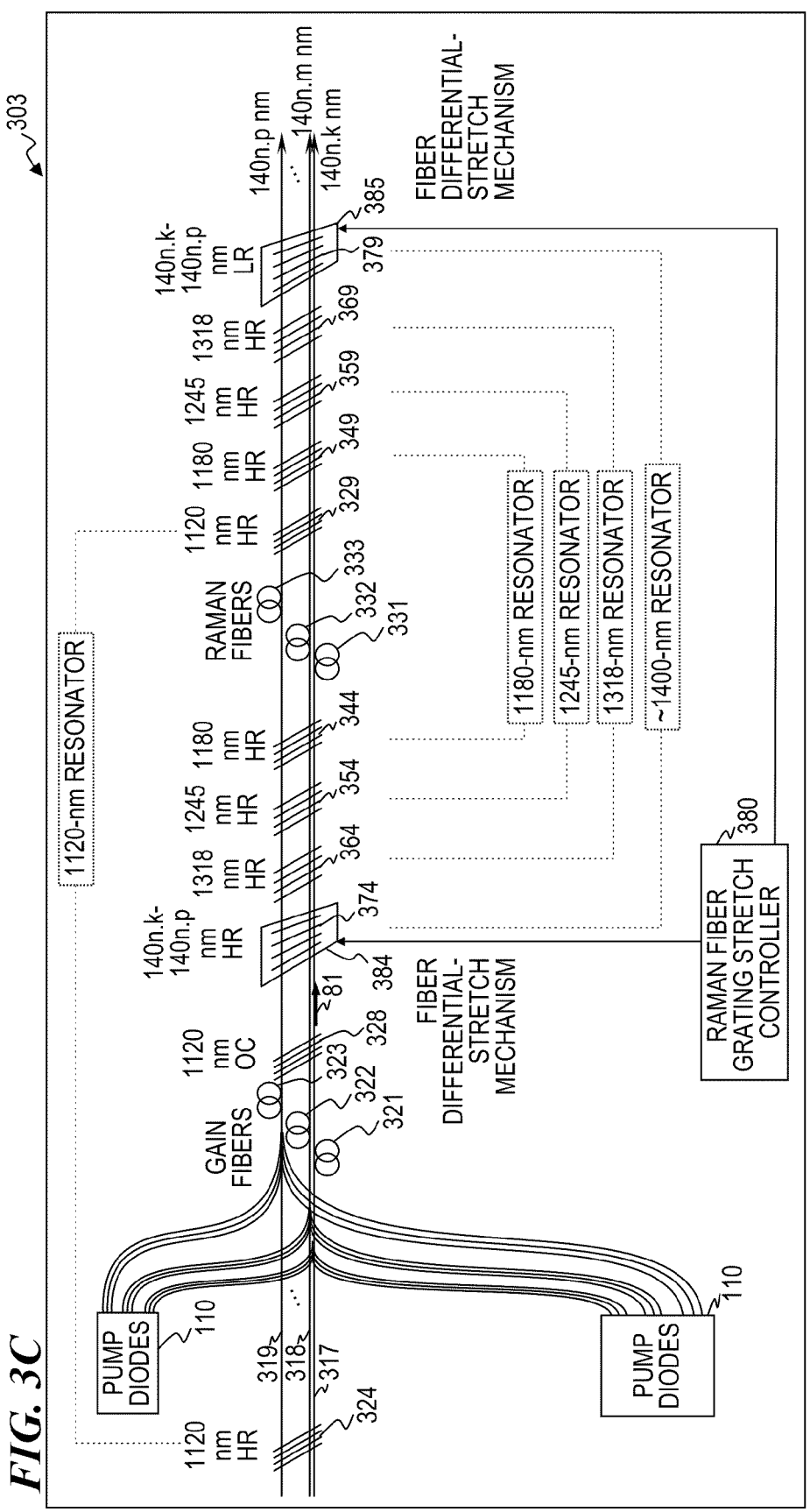
FIG. 3C is a block diagram of a subsystem 303 that includes a set of cascaded Raman-converter fiber lasers 317, 318 . . . 319 whose outputs are later spectral-beam combined into a single beam using a spectral-beam combiner such as shown in FIG. 2A or FIG. 2B, according to some embodiments of the present invention.

FIG. 3A is a block diagram of a subsystem 301 that includes a set of cascaded Raman-converter fiber lasers 311, 312 . . . 313 whose outputs are later combined into a single beam using a spectral-beam combiner such as shown in FIG. 2A or FIG. 2B, according to some embodiments of the present invention. In some such embodiments, each of the fibers is attached to one or more fiber differential-stretch mechanisms 381, 382, and/or 383 that are configured to provide incrementally different amounts of stretch to one or more of the individual gratings 324 and 329 (which reflect at around 1120 nm, in some embodiments), 344 and 349 (which reflect wavelengths at around 1180 nm, in some embodiments), 354 and 359 (which reflect at around 1245 nm, in some embodiments), 364 and 369 (which reflect at around 1318 nm, in some embodiments), and 374 (which reflects at around 1400 nm, in some embodiments). For example, in some embodiments, differential-stretch mechanisms (such as individual heating elements, each applied to gratings on different fibers and each applying a different temperature to its respective grating(s) under control of a Raman-fiber-grating-stretch controller 380) will change the grating spacings according to the temperature and the coefficient of thermal expansion of the relevant materials such that each grating reflects a different wavelength, wherein the output wavelengths are then spectrally beam combined. In other embodiments, fiber differential-stretch mechanisms 381, 382 . . . 383 are controlled by controller 380 to achieve the desired wavelengths. In some embodiments, each of the respective intermediate frequencies is also confined to a narrow bandwidth, and each different fiber has a plurality of its various Raman-wavelength gratings (e.g., all of the gratings except, perhaps, for the gratings tuned to reflect the pump wavelength and/or the gratings tuned to the initial lasing frequency (for example, a 1120-nm wavelength)) tuned to a different narrow-bandwidth wavelength (such as shown in FIG. 3A and FIG. 3B). In other embodiments, the Raman gain spectrum of each of the intermediate wavelengths is so broad that differential tuning of the intermediate wavelengths (e.g., the wavelengths of 1180 nm, 1245 nm and 1318 nm) is unnecessary, and only the final wavelengths of around 1400-1500 nm are differentially tuned (such as shown in FIG. 3C). In FIG. 3A, the plurality of cascaded Raman-converter fiber lasers 311, 312 . . . 313 each includes its own gain fiber (321, 322 . . . 323, respectively) and its own Raman fiber (331, 332 . . . 333, respectively), and each has a set of gratings tuned to the intermediate Raman-shifted wavelengths, wherein the gratings of the different fibers are each stretched by different amounts (called "differential stretching" herein) corresponding to the desired plurality of output wavelengths designated 140 n.k, 140 n.m . . . 140 n.p. In some embodiments, the gain fiber 321 and the Raman fiber 331 are provided with a length that is coiled (e.g., wrapped around one or more liquid-filled cooling drums for cooling the fibers), while the grating portions are affixed to surfaces and/or actuators that facilitate control of the grating spacings and thus control of the wavelengths.

FIG. 3B is a block diagram of a subsystem 302 that includes a set of cascaded Raman-converter fiber lasers 314, 315 . . . 316 whose outputs are later combined into a single beam using a spectral-beam combiner (SBC) such as shown in FIG. 2A or FIG. 2B, according to some embodiments of the present invention. Subsystem 302 is substantially similar to subsystem 301 of FIG. 3A, except that fiber lasers 314, 315 . . . 316 each include a partially reflective grating 379 near their respective right-hand ends, thus forming a resonator in each fiber at its respective output wavelength. In some embodiments, each of the intermediate wavelengths is also differentially tuned at incrementally different respective intermediate wavelengths.

FIG. 3C is a block diagram of a subsystem 303 that includes a set of cascaded Raman-converter fiber lasers 317, 318 . . . 319 whose outputs are later combined into a single beam using a spectral-beam combiner such as shown in FIG. 2A or FIG. 2B, according to some embodiments of the present invention. Subsystem 303 is substantially similar to subsystem 301 of FIG. 3A, except that fiber lasers 317, 318 . . . 319 each include a partially reflective grating 379 near their respective right-hand ends, and each fiber is tuned primarily only at its respective output wavelength using actuators 384 and 385, thus forming a differentially tuned resonator in each fiber at its respective output wavelength.

Figure 3D:
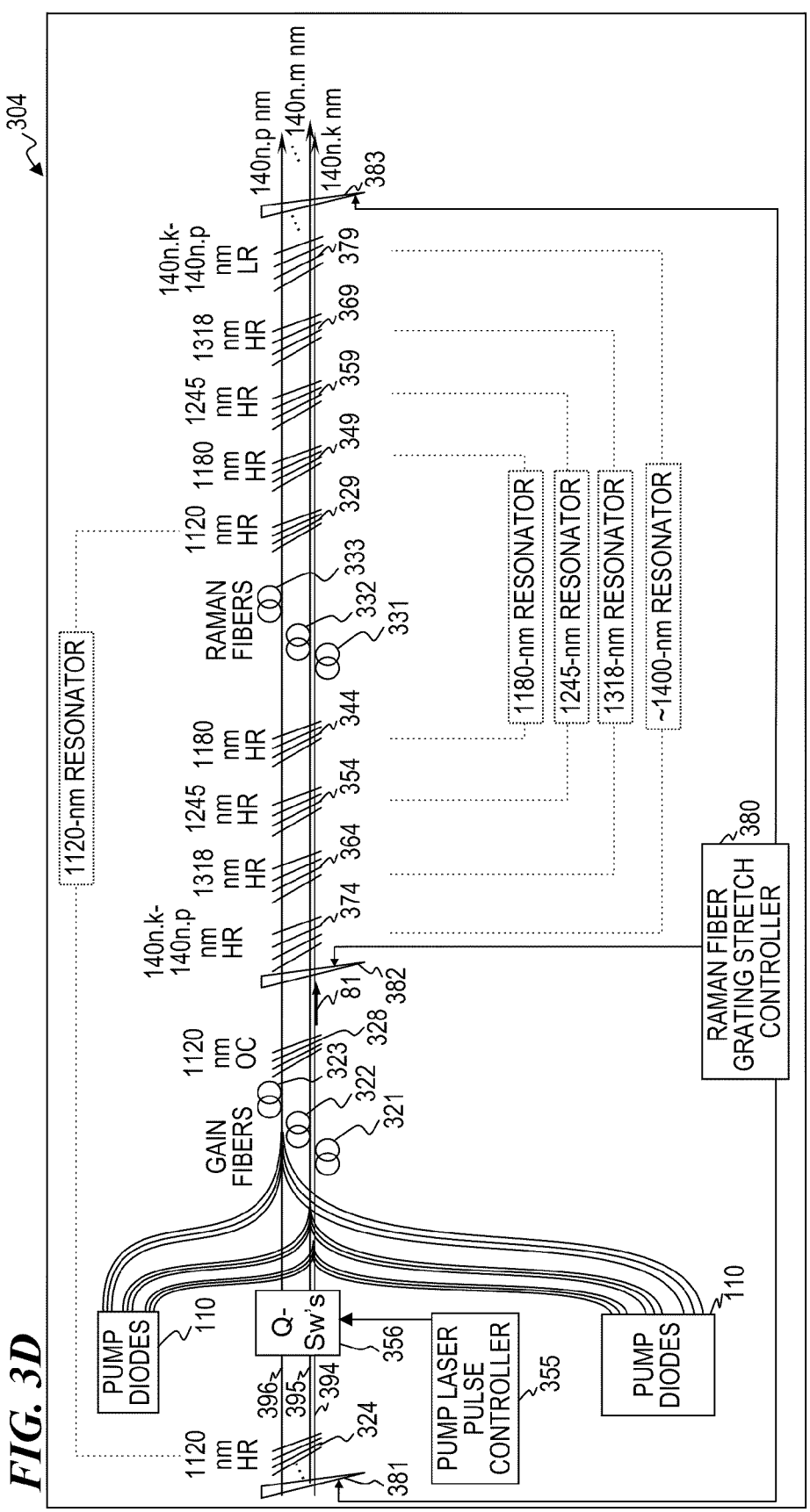
FIG. 3D is a block diagram of a subsystem 304 that includes a set of Q-switched cascaded Raman-converter fiber lasers 394, 395 . . . 396 whose outputs are later spectral-beam combined into a single beam using a spectral-beam combiner such as shown in FIG. 2A or FIG. 2B, according to some embodiments of the present invention.

FIG. 3D is a block diagram of a subsystem 304 that includes a set of Q-switched cascaded Raman-converter fiber lasers 394, 395 . . . 396 whose outputs are later spectral-beam combined into a single beam using a spectral-beam combiner such as shown in FIG. 2A or FIG. 2B, according to some embodiments of the present invention. Subsystem 304 is substantially similar to system 302 of FIG. 3B, except that the pump fiber lasers of gain fibers 321, 322 . . . 323 are pulsed. In some embodiments of any of the embodiments of the present invention (such as shown and described for the figures herein), each of the fibers uses large-mode-area gain fibers and/or Raman fibers (e.g., in some embodiments, a fiber having a core diameter and index-of-refraction profile (or a photonic-crystal configuration) that supports a full-width half-maximum (FWHM) diameter of the large mode-area signal beam in the fiber of 40microns or more, while in other embodiments, the FWHM diameter of the large mode-area signal beam in the fiber is 70 microns or more, the FWHM diameter of the large mode-area signal beam in the fiber is 100 microns or more, or the FWHM diameter of the large mode-area signal beam in the fiber is 150 microns or more). The large mode areas of the beams reduce the power density in the fibers, while otherwise in fibers having smaller mode areas, the power density would damage the fibers or end facets when operated to output pulses of about 1 MW or more. In some embodiments, the pump diodes supply 10 to 100 watts or more continuous power into the Yb-doped gain fibers 321, 322 . . . 323. In some such embodiments, the Q-switches 356 are controlled by pump-fiber-laser pulse controller 355 to allow the 1120-nm wavelength (the pump light for the Raman shifts) to reach the left-end high-reflectivity grating (which is the feedback condition for the 1120-nm-wavelength laser's lasing) only for the duration of very short pulses (e.g., pulses of about 1000 ns, 500 ns, 200 ns, 100 ns, 50 ns, 20 ns, 10 ns, 5 ns, or even shorter than 5 ns). This long-duration pumping and short-duration lasing results in lasing pulses of very high power. For example, if the pump power were 142 watts and the Yb-doped laser were 70% efficient (such that the pump power used for lasing would be about 100 watts), and used 10-ns pulses at a pulse-repetition rate (PRR) of 10 KHz (i.e., 10-ns pulses that occur every 100,000 ns), the lasing output pulses at the 1120-nm wavelength would be about 1 MW from each Yb gain fiber (100 W times 100,000 ns divided by 10 ns). Some embodiments use pulses shorter than about 5 ns in order to avoid stimulated Brillouin scattering (SBS) non-linear problems. When pulses from a plurality of up to 100 such lasers, each at a slightly different wavelength than the others, are spectral-beam combined using high-efficiency multi-layer-dielectric-coated SBC gratings (such as described in commonly assigned U.S. Pat. 7,386,211 issued Jun. 10, 2008 to Fabio Di Teodoro et al., titled "Method and apparatus for spectral-beam combining of megawatt-peak-power beams from photonic-crystal rods", and U.S. Pat. 7,199,924 titled "Apparatus and method for spectral-beam combining of high-power fiber lasers," which issued on Apr. 3, 2007 to Andrew J. W. Brown et al., both of which are incorporated herein by reference), the combined output pulses can be 10 to 100 MW or more depending on the Raman efficiency and the efficiency of the high-efficiency multi-layer-dielectric-coated SBC gratings under a high heat load. In some embodiments, the gratings are large-diameter (e.g., up to 10 cm or more diameter), actively cooled (e.g., gratings formed in direct contact on a water-cooled heat sink) reflective gratings arranged such that the output beam does not pass through an optical element, but rather is reflected from the front surface of any element that may be needed by the chosen design.

Figure 3E:
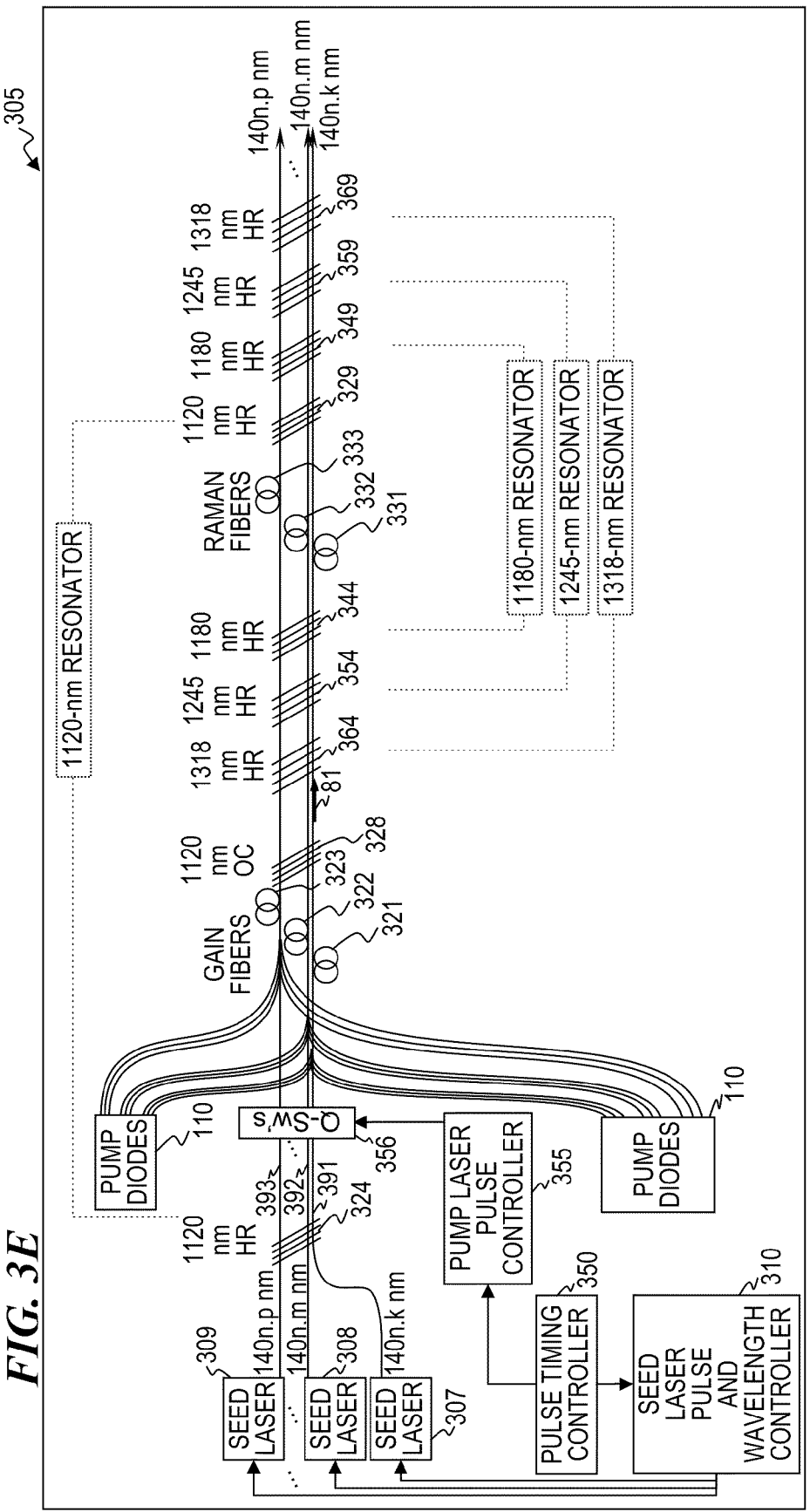
FIG. 3E is a block diagram of a subsystem 305 that includes a set of master-oscillator power amplifier (MOPA) lasers using Q-switched cascaded Raman-converter fiber amplifiers 391, 392 . . . 393 whose outputs are later spectral-beam combined into a single beam using a spectral-beam combiner such as shown in FIG. 2A or FIG. 2B, according to some embodiments of the present invention.

FIG. 3E is a block diagram of a subsystem 305 that includes a set of master-oscillator power-amplifier (MOPA) lasers using Q-switched cascaded Raman-converter fiber amplifiers 391, 392 . . . 393 whose outputs are later spectral-beam combined into a single beam using a spectral-beam combiner such as shown in FIG. 2A or FIG. 2B, according to some embodiments of the present invention. In some embodiments, the right-hand Raman resonators resonate at various intermediate wavelengths, but the output wavelength is substantially determined by seed lasers 307, 308 . . . 309 (e.g., fairly narrow linewidth semiconductor-diode lasers each tuned to a different wavelength between about 1350 nm and 1500 nm (in some embodiments, a plurality of wavelengths between 1400 nm and 1450 nm are used). In some embodiments, the pump diodes 110 emit light that pump a plurality of fiber pump lasers that use Yb-doped gain fibers 321, 322 . . . 323. The laser light from Yb-doped gain fibers 321, 322 . . . 323 (e.g., in some embodiments, about 1120-nm wavelength) is Raman shifted a plurality of times using cascaded fiber gratings that are highly reflecting at intermediate Raman wavelengths (e.g., in some embodiments, at wavelengths of about 1180 nm, about 1245 nm and about 1318 nm), wherein the last wavelength (e.g., 1318 nm) provides a Raman shift to provide gain at about 1400 nm (e.g., a relatively broad gain bandwidth that provides gain for the respective seed-laser wavelengths (e.g., 1400 nm, 1401 nm, 1402 nm and the like; in some embodiments, narrower spacings between wavelengths are used)). The laser light from the seed lasers 307, 308 . . . 309 is amplified by the Raman fiber amplifiers, and amplified versions of these seed signals are output and then spectral-beam combined as discussed above. In some embodiments, a pulse-timing controller 350 controls the timing of opening Q-switches 356 via pump-fiber-laser pulse controller 355. The Q-switches 356 are opened (made transparent to light of the 1120-nm fiber pump laser) to provide high amounts of Raman gain just in time to amplify seed-signal pulses from seed lasers 307, 308 . . . 309; the timing of the seed pulses is also controlled by pulse-timing controller 350 via the seed-laser pulse-and-wavelength controller 310. During the periods between pulses, the energy from pump-laser diodes 110 builds up in the gain fibers 321, 322 . . . 323, which do not lase since there is no feedback from the left-end grating between pulses since Q-switches 356 are substantially opaque during these times. However, during the pulses, the Q-switches 356 conduct light to and from the left-end 1120-nm-reflective gratings 324, thus providing pulsed lasing feedback at 1120 nm, which pulses are Raman shifted to eventually provide pulsed gain at about 1400 nm (i.e., at the various wavelengths of the semiconductor-diode seed lasers 307, 308 . . . 309, which determine the wavelengths of the output beams. which wavelengths are in a range near 1400 nm). In some embodiments, seed lasers other than those based on semiconductor optical amplification are used. In some embodiments, Q-switches 356 are located between the end gratings of other pairs of Raman gratings (e.g., between gratings 344 and the Raman fibers 331, 332 . . . 333), in order to stop all resonating cavities (thus preventing light from obtaining resonating feedback at the fiber-pump wavelength (e.g., 1120 nm) as well as the other Raman wavelengths (e.g., 1180 nm, 1245 nm, and 1318 nm) during the times between the desired signal pulses).

Note that gratings 324, 328, 364, 354, 344, 329, 349, 359 and 369 are configured to be transmissive to light having the seed-signal wavelengths, thus allowing the seed signals (each of which has a wavelength of about 1400 nm) to be easily launched onto the cores of fibers 391, 392 . . . 393 and then transmitted and amplified in the cores of the rest of the respective fibers (i.e., the Yb-doped gain fibers 321, 322 . . . 323 and the Raman fibers 331, 332 . . . 333) to the right in the figure. On the other hand, gratings 324 and 329 are both highly reflective at 1120 nm, keeping the 1120-nm light in the cavity between them while transmitting the seed signals at wavelengths of about 1400 nm (and transmitting the other 1180-nm, 1245-nm, and 1318-nm Raman wavelengths in the case of grating 329). Gratings 344 and 349 are both highly reflective at 1180 nm, keeping the 1180-nm light in the cavity between them while transmitting the seed signals at wavelengths of about 1400 nm (and transmitting the 1120-nm pump wavelength, and the 1245-nm and 1318-nm Raman wavelengths). Gratings 354 and 359 are both highly reflective at 1245 nm, keeping the 1245-nm light in the cavity between them while transmitting the seed signals at wavelengths of about 1400 nm (and transmitting the other 1120-nm, and 1318-nm Raman wavelengths). Gratings 364 and 369 are both highly reflective at 1318 nm, keeping the 1318-nm light in the cavity between them while transmitting the seed signals at wavelengths of about 1400 nm (and transmitting the other 1120-nm fiber-pump wavelengths in the case of grating 354).

Figure 4:
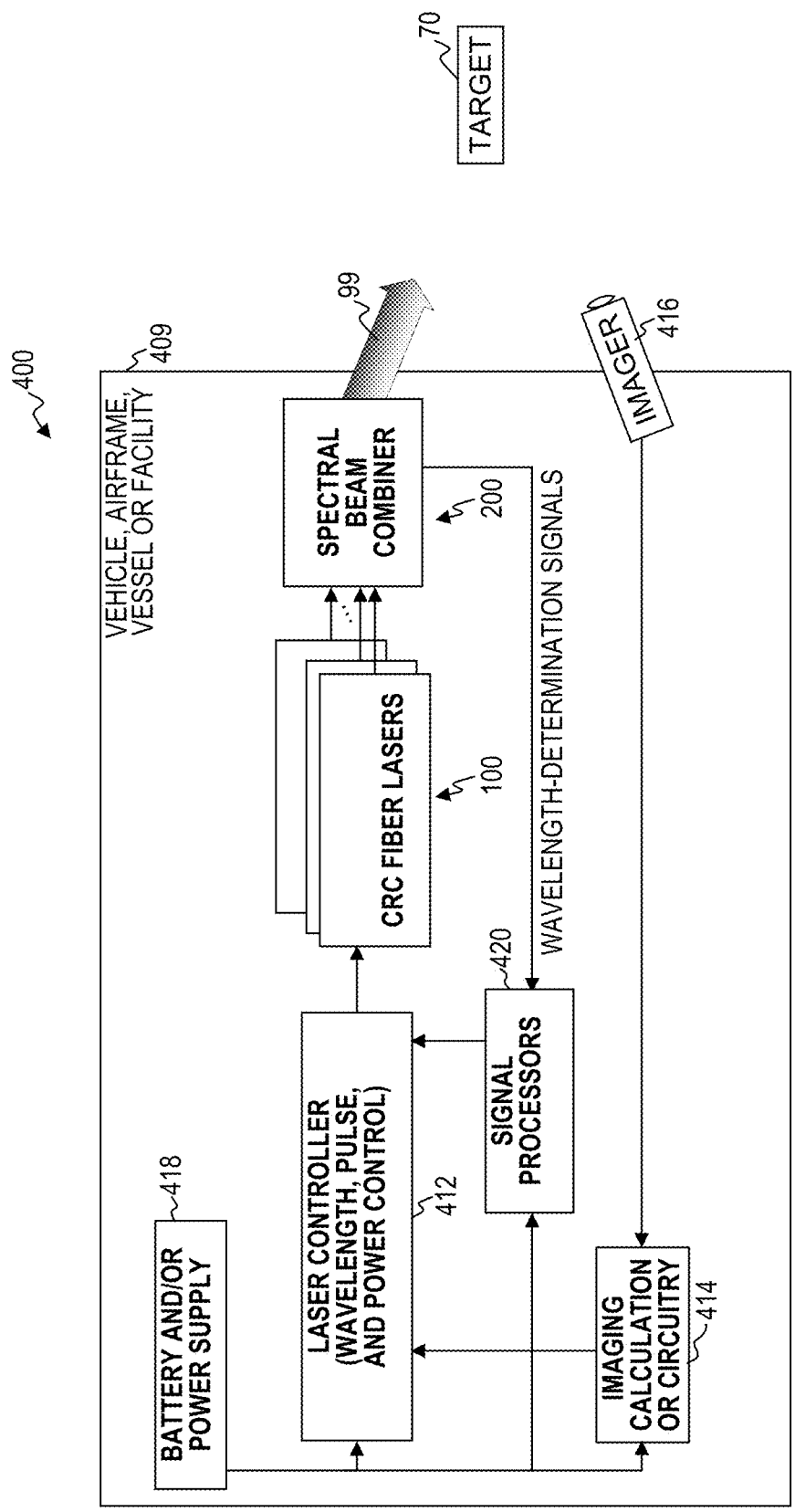
FIG. 4 is a block diagram of a high-power SBC-CRC-fiber-laser control system 400 using one or more of the SBC-CRC-fiber-laser systems as described herein.

FIG. 4 is a block diagram of a high-power SBC-CRC-fiber-laser control system in an overall product 400 (e.g., a vehicle such as a land vehicle (such as a tank or remotely-operated robotic vehicle), airframe (such as a helicopter or jet airplane), vessel (such as a frigate, destroyer or aircraft carrier) or facility (such as an airport or bunker)) using one or more of the SBC-CRC-fiber-laser systems as described herein. In some embodiments, system 400 includes the vehicle, airframe, vessel or facility enclosure 409 and its other contents (e.g., engines and control systems), one or more battery and/or electrical power supplies 418, a laser controller 412 that provides the control of wavelength, pulse timing and duration for embodiments using pulse signals (other embodiments use CW signal beams), output-power control, direction control of the output beam and the like, an imaging calculation microprocessor and/or circuitry that obtains an image signal from imager 416 and calculates such data as target location and velocity that is then delivered to laser controller 412, signal processors 420 that receive wavelength-determination signals and/or directional-drift signals from the SBC module 200 (with its associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to laser controller 412. In some embodiments, laser controller 412 generates the control and power signals that are sent to CRC-fiber-laser module 100, which then delivers high-power optical beams at eye-safer wavelengths to SBC 200, which then combines the laser beams into a single output laser SBC beam 99 that is directed toward target 70 (e.g., a hostile aircraft or spacecraft), according to the control information that was generated based on image information obtained from imager 416. In some embodiments, system 400 is part of, and used as an element of, a directed-energy (DE) weapon carried by a vehicle 409 (such as a tank, an aircraft, or a naval vessel).

In some embodiments, the Yb-doped pump lasers (e.g., gain fibers 321, 322, . . . 323 of FIG. 3B) each output CW beams each having continuous power levels of 1 kW or more, and when Raman shifted, the CW light outputs of CRC fiber lasers 100 each approach or exceed 100 watts (W) at wavelengths of 1350 nm to 1500 nm (in some embodiments, other wavelength ranges are used). In other embodiments, the Yb-doped pump lasers (e.g., gain fibers 321, 322, . . . 323 of FIG. 3B) each output individual pulses having peak power levels of 1 MW or more, and when Raman shifted, the pulsed light outputs of CRC fiber lasers 100 each approach or exceed 100 kilowatts (kW) at wavelengths of 1350 nm to 1500 nm (in some embodiments, other wavelength ranges are used). In some embodiments, laser controller 412 causes pulses of the laser beams to be in synchrony with one another such that the pulsed output 99 (which includes a series of pulses) approaches one megawatt or more of directed pulsed energy. In some embodiments, pulsed output 99 includes the pulsed power of a plurality of CRC fiber lasers such that a light pulse in output 99 is between 1.001 kilowatts (kW) and 10 kW. In some embodiments, a light pulse in output 99 is between 1.001 kW and 2 kW. In some embodiments, a light pulse in output 99 is between 2.001 kW and 4 kW. In some embodiments, a light pulse in output 99 is between 4.001 kW and 10 kW. In some embodiments, a light pulse in output 99 is between 10.001 kW and 20 kW. In some embodiments, a light pulse in output 99 is between 20.001 kW and 40 kW. In some embodiments, a light pulse in output 99 is between 40.001 kW and 100 kW. In some embodiments, a light pulse in output 99 is between 100.1 kW and 200 kW. In some embodiments, a light pulse in output 99 is between 200.1 kW and 400 kW. In some embodiments, a light pulse in output 99 is between 400.1 kW and 1.0 megawatt (MW). In some embodiments, a light pulse in output 99 is between 1.0001 MW and 2.0 MW. In some embodiments, a light pulse in output 99 is between 2.0001 MW and 4 MW. In some embodiments, a light pulse in output 99 is between 4.0001 MW and 10 MW. In some embodiments, a light pulse in output 99 is between 10.0001 MW and 100 MW. In some embodiments, a light pulse in output 99 exceeds 100 MW.

Figure 5A:
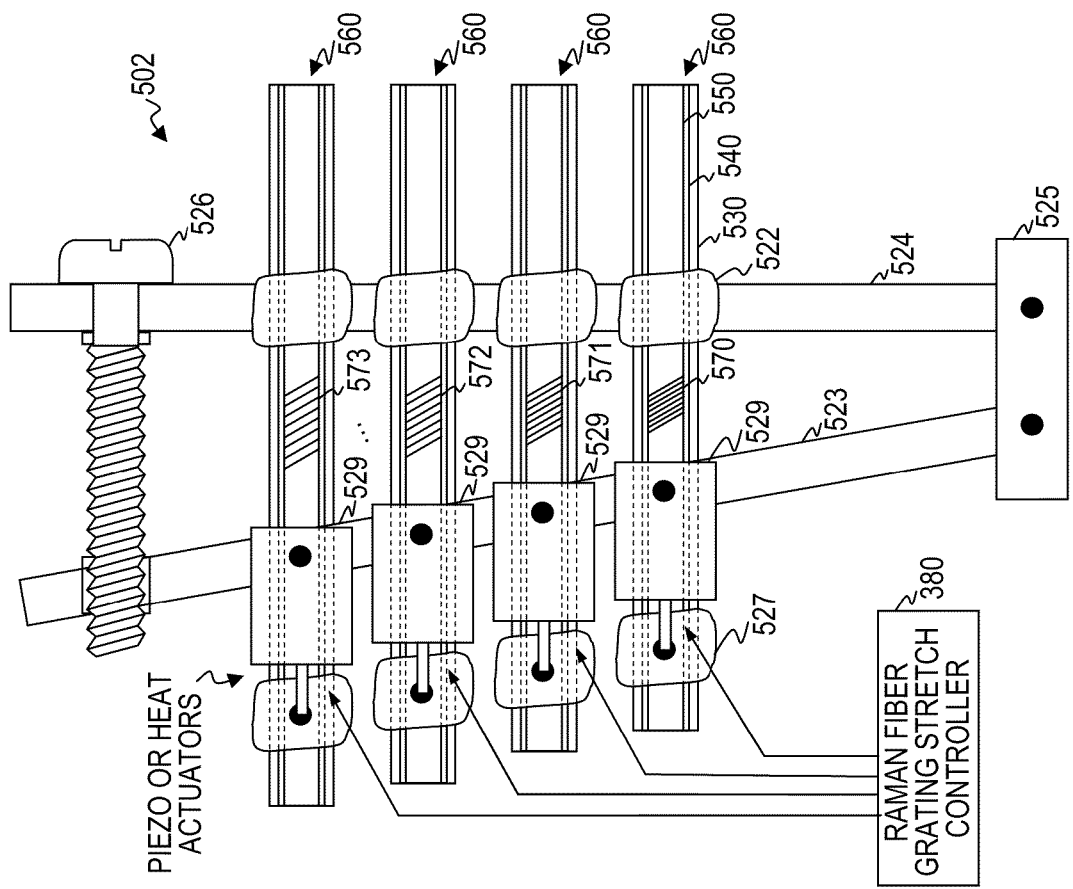
FIG. 5A is a block diagram of a mechanical differential fiber-stretcher system 501, according to some embodiments of the present invention.

FIG. 5A is a block diagram of a mechanical differential fiber-stretcher system 501, according to some embodiments of the present invention. In some embodiments, system 501 includes a base 525 to which two arms 523 and 524 are attached. In some embodiments, base 525 and one of the arms (e.g., 524) are a single piece. Mechanical actuator 526 (e.g., a fine-pitch screw having anti-backlash compensation) is precisely movable in very small amounts to change the angle between arms 523 and 524. In some embodiments, each one of a plurality of fibers 560 (e.g., each having a core 550, an inner cladding 540, and an outer cladding 520) is attached (e.g., by adhesive 521 and 522 (such as epoxy) or by laser welding or soldering or other suitable attachment mechanism) to arm 523 and to arm 524 such that when arm 523 moves relative to arm 524, the angle change between the two arms stretches each fiber 560 by an incrementally different amount, thus making the gratings' reflective wavelengths each change by a corresponding different amount. Thus grating 570 would be stretched to be highly reflective at a first wavelength, grating 571 would be stretched to be highly reflective at a second wavelength that is slightly longer than the first wavelength, grating 572 would be stretched to be highly reflective at a third wavelength that is slightly longer than the second wavelength, and grating 573 would be stretched to be highly reflective at a fourth wavelength that is slightly longer than the third wavelength. In some embodiments, each one of a plurality of additional fibers is similarly adjusted.

Figure 5B:
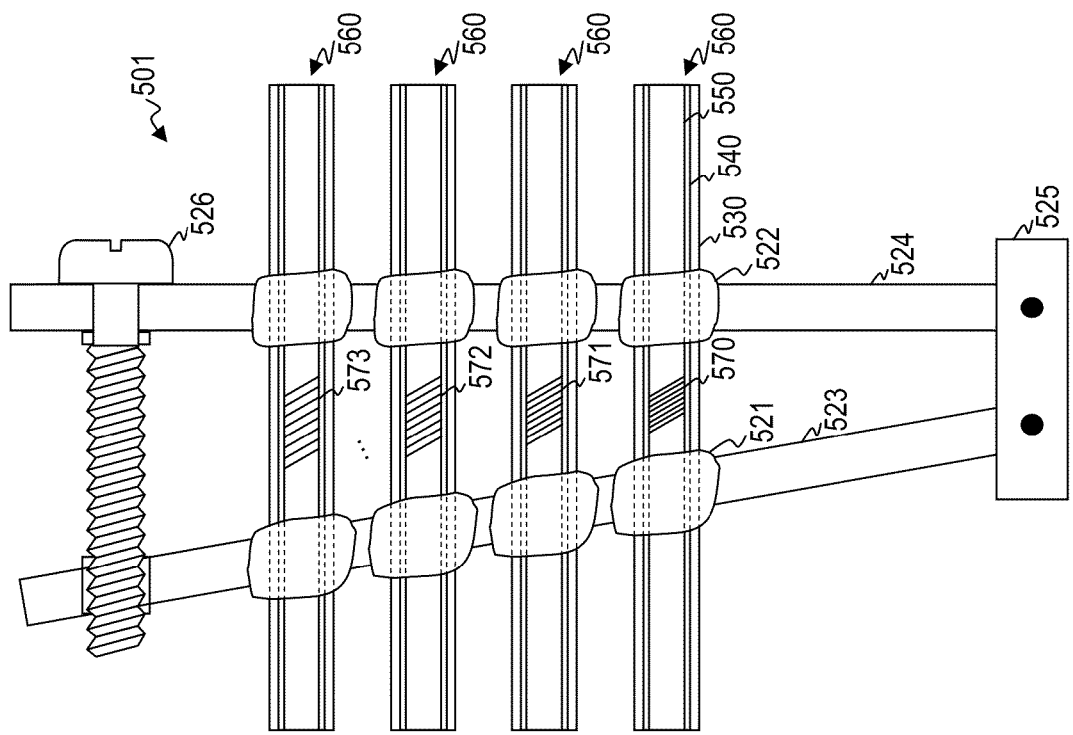
FIG. 5B is a block diagram of a combined mechanical and electrically controlled differential fiber-stretcher system 502, according to some embodiments of the present invention.

FIG. 5B is a block diagram of a combined mechanical and electrically controlled differential fiber-stretcher system 502, according to some embodiments of the present invention. In some embodiments, system 502 also includes a base 525 to which two arms 523 and 524 are attached. In some embodiments, base 525 and one of the arms (e.g., 524) are again a single piece. Mechanical actuator 526 (e.g., a fine-pitch screw) is precisely movable in very small amounts to change the angle between arms 523 and 524. In some embodiments, each one of a plurality of fibers 560 (e.g., each having a core 550, an inner cladding 540, and an outer cladding 520) is attached (e.g., by adhesive 522 (such as epoxy) or by laser welding or soldering or other suitable attachment mechanism) at one (e.g., right-hand) attachment location on the fiber to a point on arm 524, and at the fiber's other (e.g., left-hand) attachment location to an end of an electrically controlled actuator 529 attached to arm 523 (where the fiber 560 is attached, e.g., by adhesive 527 (such as epoxy) or by laser welding or soldering or other suitable attachment mechanism), such that when arm 523 moves relative to arm 524, the angle change stretches each fiber by an incrementally different amount, thus making the gratings' reflective wavelengths each change by a corresponding different amount. In addition, with actuator 526 in a fixed position (and thus arms 523 and 524 at a fixed angle relative to one another), each actuator 529 (e.g., in some embodiments, each includes a piezo actuator and/or a heat actuator that acts by a raised temperature that is applied to a fiber material having a suitable thermal coefficient of expansion) is individually controlled by controller 380 to finely tune the wavelength of each fiber on a dynamic basis (e.g., in some embodiments, as determined by a wavelength signal processor such as processor 420 of FIG. 4). Thus grating 570 would be stretched to a first wavelength on a coarse basis by mechanical actuator 526 and a fine-granularity dynamic basis (varying as necessary over time) by actuator 529 and controller 380, grating 571 would be similarly stretched and tuned to a second wavelength that is slightly longer than the first wavelength, grating 572 would be similarly stretched and tuned to a third wavelength that is slightly longer than the second wavelength, and grating 573 would be similarly stretched and tuned to a fourth wavelength that is slightly longer than the third wavelength. Of course, in some embodiments a great many more fibers 560 are similarly attached, with mechanical actuator 526 and each fiber 560's electrically controlled actuator 529 determining each fiber's characteristics such that the respective fiber is tuned to its desired wavelength.

Figure 5C:
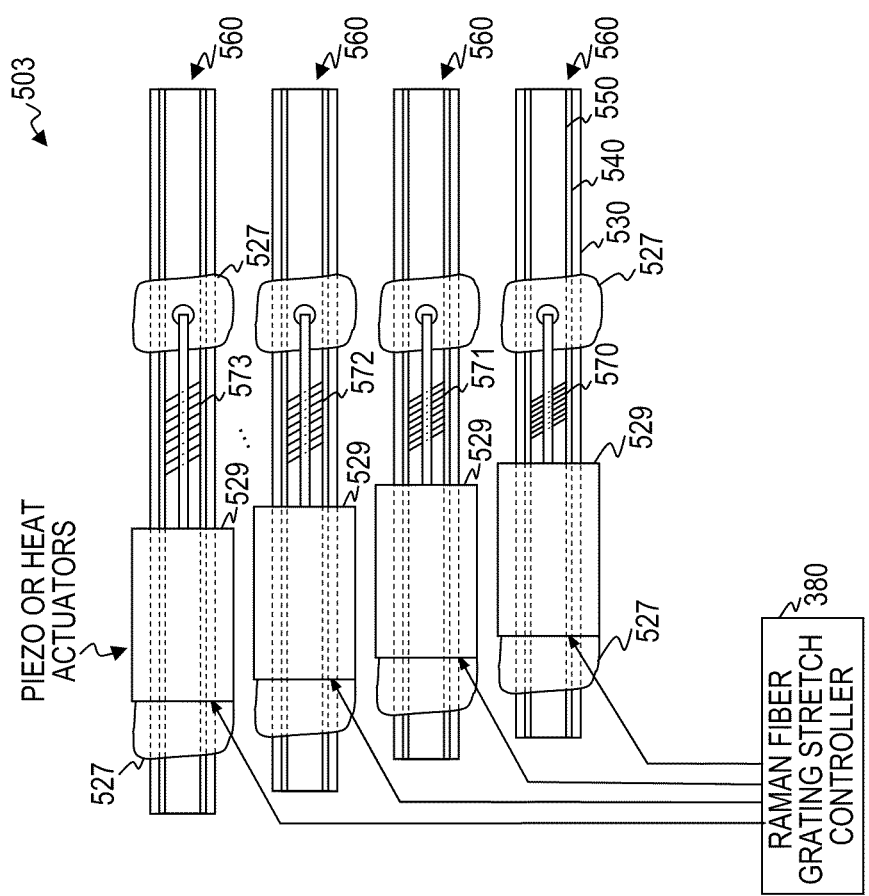
FIG. 5C is a block diagram of an electrically controlled differential fiber-stretcher system 503, according to some embodiments of the present invention.

FIG. 5C is a block diagram of an electrically controlled differential fiber-stretcher system 503, according to some embodiments of the present invention. In some embodiments, system 503 is substantially the same as system 502 of FIG. 5B, except system 503 omits base 525 and two arms 523 and 524. In some embodiments, each one of a plurality of fibers 560 (e.g., each having a core 550, an inner cladding 540, and an outer cladding 520) is attached (e.g., by adhesive 527 (such as epoxy) or by laser welding or soldering or other suitable attachment mechanism) at one (e.g., right-hand) attachment location on the fiber to a point on actuator 529, and at its other (e.g., left-hand) attachment location on the fiber to an opposite end of electrically controlled actuator 529 (where it is attached, e.g., by adhesive 527 (such as epoxy) or by laser welding or soldering or other suitable attachment mechanism). In some embodiments, the only adjustment is the lengthening or shortening of each fiber 560's respective actuator 529 as controlled by controller 380, which adjusts each to a different stretch amount as needed to achieve the desired plurality of wavelengths, thus making the gratings' reflective wavelengths each change by a corresponding different amount. In addition, each actuator 529 is individually controlled by controller 380 to finely tune the wavelength of each fiber 560 on a dynamic basis (e.g., in some embodiments, as determined by a wavelength signal processor such as processor 420 of FIG. 4). Of course, in some embodiments a great many more fibers 560 are similarly attached to such actuators 529, and each is tuned to its desired wavelength.

In some embodiments, the present invention provides a method that includes generating a plurality of different wavelengths of laser light by Raman shifting fiber pump light in optical fibers in order to Raman amplify the plurality of different output wavelengths, each of which is longer than 1300 nm; and spectral-beam combining the plurality of Raman amplified wavelengths into a single output beam. Some embodiments further include providing a vehicle having an enclosure; supplying electrical power; using the electrical power, controlling and powering the plurality of optical-fiber Raman laser beams; and controlling an output direction of the single output beam in one of a plurality of different possible directions relative to the vehicle.

In some embodiments of the method, the generating of the plurality of different wavelengths of laser light by Raman amplifying in optical fibers includes using an opposing pair of narrow-linewidth fiber Bragg gratings to resonate at the plurality of output wavelengths each having a full-width half-maximum (FWHM) linewidth of no more than 1 nm for each of a plurality of the wavelengths.

In some embodiments of the method, the generating of the plurality of different wavelengths of laser light by Raman shifting in optical fibers includes Raman shifting of each of a plurality of wavelengths by about 13 terahertz (THz) to 14 THz. In other embodiments of the method, the generating of the plurality of different wavelengths of laser light by Raman shifting in optical fibers includes Raman shifting of each of a plurality of wavelengths by more than 15 THz.

In some embodiments of the method, the generating of the plurality of different wavelengths of laser light by Raman shifting in optical fibers includes Raman shifting no more than four times.

In some embodiments of the method, the generating of the plurality of different wavelengths of laser light includes Raman lasing in a power-oscillating mode.

In some embodiments of the method, the generating of the plurality of different wavelengths of laser light includes Raman amplifying seed signals in a master-oscillating power amplifying mode.

In some embodiments, the present invention provides an apparatus that includes optical-fiber means for generating a plurality of different wavelengths of laser light by Raman shifting fiber pump light in order to Raman amplify the plurality of different output wavelengths, each of which is longer than 1300 nm; and means for spectral-beam combining the plurality of Raman amplified wavelengths into a single output beam.

Some embodiments of the apparatus further include a vehicle having an enclosure; an electrical power supply that supplies electrical power in the vehicle; means for using the electrical power, means for controlling and means for powering the means for generating the plurality of different wavelengths; and means for controlling an output direction of the single output beam in one of a plurality of different possible directions relative to the vehicle.

In some embodiments of the apparatus, the means for generating the plurality of different wavelengths of laser light by Raman amplifying includes grating means for resonating at the plurality of output wavelengths each having a full-width half-maximum (FWHM) linewidth of no more than 1 nm for each of a plurality of the wavelengths.

In some embodiments of the apparatus, the means for generating the plurality of different wavelengths of laser light by Raman shifting includes means for Raman shifting of each of a plurality of wavelengths by more than 15 terahertz (THz).

In some embodiments of the apparatus, the means for generating the plurality of different wavelengths of laser light includes means for Raman shifting no more than four times.

In some embodiments of the apparatus, the means for generating the plurality of different wavelengths of laser light includes means for Raman lasing in a power-oscillating mode.

In some embodiments of the apparatus, the means for generating the plurality of different wavelengths of laser light includes means for Raman amplifying seed signals in a master-oscillating power amplifying mode.

In some embodiments, the present invention provides an apparatus that includes a plurality of optical-fiber Raman lasers each outputting a beam of a different wavelength longer than 1300 nm; and a spectral-beam combiner using at least one high-efficiency grating that is operably coupled to receive the beams from the plurality of optical-fiber Raman lasers and configured to combine the beams into a single output beam. Some embodiments of the apparatus further include a vehicle having an enclosure; an electrical power supply attached to the vehicle; a laser controller operatively coupled to receive electrical power from the electrical power supply and operably coupled to power and control the plurality of optical-fiber Raman lasers; and a beam-direction controller operably coupled to receive the single output beam from the spectral-beam combiner and operable to direct the single output beam in one of a plurality of different possible directions relative to the vehicle. In some embodiments of the apparatus, the plurality of optical-fiber Raman lasers each includes narrow-linewidth fiber gratings having a full-width half-maximum (FWHM) linewidth of no more than 1 nm for each of a plurality of the wavelengths. In some embodiments of the apparatus, the plurality of optical-fiber Raman lasers are configured to Raman shift of each of a plurality of wavelengths by more than 15 terahertz (THz). In some embodiments of the apparatus, the plurality of optical-fiber Raman lasers are configures to Raman shift no more than four times. In some embodiments of the apparatus, the plurality of optical-fiber Raman lasers are each configured as Raman power-oscillator lasers. In some embodiments of the apparatus, plurality of optical-fiber Raman lasers include a plurality of Raman amplifiers and plurality of seed lasers each of which has an output that is operatively coupled into a respective one of the plurality of Raman amplifier in a master-oscillator power-amplifier mode.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
providing a plurality of Raman optical fibers including a first optical fiber and a second optical fiber;
providing a plurality of intermediate-wavelength grating pairs, wherein each intermediate-wavelength grating pair of the plurality of intermediate-wavelength grating pairs is configured to resonate at one or more of a plurality of different intermediate Raman-shifted wavelengths;
providing at least a first common grating;
optically coupling the first common grating to both the first optical fiber and the second optical fiber;
generating a plurality of different output wavelengths of laser light, wherein the plurality of different output wavelengths includes a first output wavelength and a second output wavelength;

successively Raman shifting a base-wavelength Raman pump light in each one of the plurality of optical fibers to each successive one of the plurality of different intermediate Raman-shifted wavelengths;

Raman amplifying, in each of the plurality of optical fibers, the plurality of different output wavelengths, each of which is longer than 1300 nm; and spectral-beam combining the plurality of Raman amplified wavelengths into a single output beam.

2. The method of claim 1, further comprising:
providing a vehicle having an enclosure;
supplying electrical power;
using the electrical power, controlling and powering the Raman shifting and the Raman amplifying; and
controlling an output direction of the single output beam in one of a plurality of different possible directions relative to the vehicle.

3. The method of claim 1, wherein the first common grating is a narrow-linewidth fiber Bragg grating, and wherein the narrow-linewidth fiber Bragg grating has a full-width half-maximum (FWHM) linewidth of no more than 1 nm for one of the plurality of different output wavelengths.

4. The method of claim 1, wherein the successively Raman shifting of the base-wavelength Raman pump light to each successive one of the plurality of different intermediate Raman-shifted wavelengths includes successively Raman shifting the base-wavelength Raman pump light by more than 15 terahertz (THz) for each of the plurality of different intermediate Raman-shifted wavelengths.

5. The method of claim 1, wherein the successively Raman shifting of the base-wavelength Raman pump light to each successive one of the plurality of different intermediate Raman-shifted wavelengths consists of successively Raman shifting the base-wavelength Raman pump light a total of no more than four times.

6. The method of claim 1, wherein the generating of the plurality of different wavelengths of laser light includes Raman lasing in a power-oscillating mode.

7. The method of claim 1, wherein the first common grating is highly transmissive at the plurality of different output wavelengths, and wherein the generating of the plurality of different output wavelengths of laser light includes:
providing a plurality of seed lasers to provide a plurality of seed signals, each seed signal having one of the plurality of different output wavelengths;
generating the plurality of different output wavelengths using the plurality of seed lasers; and
coupling the plurality of seed signals through the first common grating into the plurality of optical fibers such that the Raman amplifying includes Raman amplifying each one of the plurality of seed signals in a master-oscillating power amplifying mode.

8. The method of claim 1, wherein each one of the plurality of intermediate-wavelength grating pairs is optically coupled to each of the plurality of optical fibers.

9. The method of claim 1, wherein the generating of the plurality of different output wavelengths is a last shift of the successively Raman shifting through each successive one of the plurality of the different intermediate Raman-shifted wavelengths, and wherein the generating of the plurality of different output wavelengths includes reflecting each one of the plurality of different output wavelengths using the first common grating to determine each respective one of the plurality of output wavelengths.

10. The method of claim 1, further comprising:
providing an output-wavelengths grating pair that resonates light at the first output wavelength in the first optical fiber and that resonates light at the second output wavelength in the second optical fiber;
operating the first optical fiber and the second optical fiber and the output-wavelengths grating pair as Raman lasers; and
differentially stretching only the output-wavelengths grating pair but not differentially stretching the plurality of intermediate-wavelength grating pairs.

11. The method of claim 1, wherein the first common grating is highly transmissive at the plurality of different output wavelengths, and wherein the generating of the plurality of different output wavelengths includes:
providing a plurality of seed lasers to provide a plurality of seed signals, each seed signal having one of the plurality of different output wavelengths;
generating the plurality of different output wavelengths using the plurality of seed lasers;
providing a first plurality of oscillating cavities, each of the first plurality of oscillating cavities including a gain fiber;
generating the base-wavelength Raman pump light in the first plurality of oscillating cavities and reflecting the base-wavelength Raman pump light at each end of the plurality of oscillating cavities;
Q-switching the base-wavelength Raman pump light within the plurality of oscillating cavities to provide Q-switched Raman pump light; and
coupling the plurality of seed signals through the first common grating into the plurality of optical fibers such that the Raman amplifying includes Q-switched Raman amplifying each one of the plurality of seed signals using energy from the Raman-shifted Q-switched Raman pump light.

12. The method of claim 1, wherein the first common grating is highly reflective at the plurality of different output wavelengths, the method further comprising:
controlling the first output wavelength by having the first common grating highly reflective at the first output wavelength in the first optical fiber;
controlling the second output wavelength by having the first common grating highly reflective at the second output wavelength in the second optical fiber; and
differentially stretching the first common grating in order to cause the first output wavelength to be a different wavelength than the second output wavelength.

13. The method of claim 1, wherein the first common grating forms a first end of a Raman-pump-wavelength resonator on both the first optical fiber and the second optical fiber, and wherein the first common grating is a high-reflectivity grating, the method further comprising:
highly reflecting the first Raman pump wavelength at the first common grating in both the first optical fiber and the second optical fiber.

14. An apparatus comprising:
a plurality of optical-fiber Raman amplifiers including a first optical-fiber Raman amplifier and a second optical-fiber Raman amplifier;
a plurality of intermediate-wavelength grating pairs, wherein each intermediate-wavelength grating pair of the plurality of intermediate-wavelength grating pairs is configured to resonate at one or more of a plurality of different intermediate Raman-shifted wavelengths;
a first common grating, wherein the first common grating is optically coupled to both the first optical-fiber Raman amplifier and the second optical-fiber Raman amplifier;
an output-wavelength generator that generates a plurality of different output wavelengths of laser light that includes a first output wavelength and a second output wavelength, wherein each one of the plurality of optical-fiber Raman amplifiers is further configured to successively Raman shift a base-wavelength Raman pump light to each successive one of the plurality of different intermediate Raman-shifted wavelengths, and to Raman amplify the plurality of different output wavelengths, each of which is longer than 1300 nm; and a spectral-beam combiner using at least one high-efficiency grating that is operably coupled to receive the plurality of different output wavelengths from the plurality of optical-fiber Raman amplifiers and configured to combine the plurality of different output wavelengths into a single output beam.

15. The apparatus of claim 14, further comprising:
a vehicle having an enclosure;
an electrical power supply attached to the vehicle;
a laser controller operatively coupled to receive electrical power from the electrical power supply and operably coupled to power and control the plurality of optical-fiber Raman amplifiers; and
a beam-direction controller operably coupled to receive the single output beam from the spectral-beam combiner and operable to direct the single output beam in one of a plurality of different possible directions relative to the vehicle.

16. The apparatus of claim 14, wherein the first common grating is a narrow-linewidth fiber grating having a full-width half-maximum (FWHM) linewidth of no more than 1 nm for one of the plurality of different wavelengths.

17. The apparatus of claim 14, wherein each one of the plurality of optical-fiber Raman amplifiers is further configured to successively Raman shift the base-wavelength Raman pump light by more than 15 terahertz (THz) for a plurality of the successive ones of the plurality of different intermediate Raman-shifted wavelengths.

18. The apparatus of claim 14, wherein each one of the plurality of optical-fiber Raman amplifiers is configured to successively Raman shift the base-wavelength Raman pump light a total of no more than four times.

19. The apparatus of claim 14, wherein each one of the plurality of optical-fiber Raman amplifiers is configured as a Raman power-oscillator laser.

20. The apparatus of claim 14, wherein the output-wavelength generator includes a plurality of seed lasers configured to generate a plurality of seed signals, each seed signal having one of the plurality of different output wavelengths, wherein the plurality of seed signals are coupled through the first common grating into the plurality of optical-fiber Raman amplifiers such that each one of the plurality of optical-fiber Raman amplifiers is further configured to Raman amplify each one of the plurality of seed signals in a master-oscillator power-amplifier mode.

21. The apparatus of claim 14, further comprising:
a first plurality of oscillating cavities, wherein each of the first plurality of oscillating cavities includes a gain fiber, and wherein the first plurality of oscillating cavities is configured to generate the base-wavelength Raman pump light;
a Q-switch configured to Q-switch the base-wavelength Raman pump light to provide Q-switched Raman pump light;
wherein the output-wavelength generator includes a plurality of seed lasers configured to generate a plurality of seed signals, each seed signal having one of the plurality of different output wavelengths; and
wherein the plurality of seed signals are coupled through the first common grating into the plurality optical-fiber Raman amplifiers such that each one of the plurality of optical-fiber Raman amplifiers is further configured to Q-switchedly Raman amplify a respective one of the plurality of seed signals using energy from the Raman-shifted Q-switched Raman pump light.

22. The apparatus of claim 14, wherein the output-wavelength generator includes an output-wavelengths grating pair that resonates light at the first output wavelength in the first optical-fiber Raman amplifier and that resonates light at the second output wavelength in the second optical-fiber Raman amplifier, the apparatus further comprising:
a differential-stretch mechanism configured to differentially stretch only the output-wavelengths grating pair but not differentially stretch the plurality of intermediate-wavelength grating pairs.

* * * * *